US012599851B2

(12) United States Patent
    Greenwood

(10) Patent No.: US 12,599,851 B2
(45) Date of Patent: Apr. 14, 2026

(54) MULTI-COLUMN CHROMATOGRAPHY SYSTEMS WITH ROTATABLE VALVE ASSEMBLIES

(71) Applicant: LIFE TECHNOLOGIES CORPORATION, Carlsbad, CA (US)

(72) Inventor: John Paul Greenwood, Carlsbad, CA (US)

(73) Assignee: Life Technologies Corporation, Carlsbad, CA (US)

( * ) Notice: Subject to any disclaimer, the term of this patent is extended or adjusted under 35 U.S.C. 154(b) by 278 days.

(21) Appl. No.: 18/256,913

(22) PCT Filed: Dec. 8, 2021

(86) PCT No.: PCT/US2021/072812

§ 371 (c)(1),
(2) Date: Jun. 9, 2023

(87) PCT Pub. No.: WO2022/126115

PCT Pub. Date: Jun. 16, 2022

(65) Prior Publication Data

US 2024/0024797 A1    Jan. 25, 2024

Related U.S. Application Data

(60) Provisional application No. 63/124,529, filed on Dec. 11, 2020.

(51) Int. Cl.
    *B01D 15/18*    (2006.01)
    *B01D 15/14*    (2006.01)
    (Continued)

(52) U.S. Cl.
    CPC ......... *B01D 15/1864* (2013.01); *B01D 15/14* (2013.01); *F16K 11/0856* (2013.01); (Continued)

(58) Field of Classification Search
    CPC ............... B01D 15/1864; B01D 15/14; B01D 2311/16; F16K 11/0856; G01N 30/20; (Continued)

(56) References Cited

U.S. PATENT DOCUMENTS 7,288,200 B1    10/2007   Hotier et al.
9,371,921 B2    6/2016    Whitaker
(Continued)

FOREIGN PATENT DOCUMENTS

CN        1766645 A      5/2006
CN        107820551 A    3/2018
(Continued)

OTHER PUBLICATIONS

PCT/US2021/072812, International Search Report and Written Opinion, Apr. 4, 2022, 14 pages.

*Primary Examiner* — Ryan D Walsh

(57)              ABSTRACT

A chromatography system includes a first chromatography column and a panel having a top face and an opposing bottom face, a first cavity being formed on the panel so as to pass through the top face and be encircled by an inner surface. The panel bounds an inlet fluid channel having an end terminating at an inlet opening formed on the inner surface encircling the first cavity so that the inlet fluid channel communicates with the first cavity. The panel also bounds a plurality of first outlet fluid channels each having an end terminating at an outlet opening formed on the inner surface encircling the first cavity so that each of the plurality of first outlet fluid channels communicate with the first cavity, a first one of the plurality of first outlet fluid channels being in fluid communication with the first chromatography column. A first valve is rotatably disposed within the first cavity.

20 Claims, 19 Drawing Sheets

(51) Int. Cl.

| | |
|---|---|
| *F16K 11/085* | (2006.01) |
| *G01N 30/20* | (2006.01) |
| *G01N 30/38* | (2006.01) |
| *G01N 30/46* | (2006.01) |
| *G01N 30/60* | (2006.01) |

(52) U.S. Cl.

CPC ............. *G01N 30/20* (2013.01); *G01N 30/38* (2013.01); *G01N 30/468* (2013.01); *G01N 30/6034* (2013.01); *G01N 30/6047* (2013.01); *B01D 2311/16* (2013.01); *G01N 2030/202* (2013.01)

(58) Field of Classification Search

CPC .. G01N 30/38; G01N 30/468; G01N 30/6034; G01N 30/6047; G01N 2030/202

See application file for complete search history.

(56) References Cited

U.S. PATENT DOCUMENTS

| | | | | |
|---|---|---|---|---|
| 9,481,477 | B2 | 11/2016 | Kjar | |
| 2004/0103947 | A1* | 6/2004 | McLane | B60H 1/00485 |
| | | | | 137/625.47 |
| 2013/0153071 | A1 | 6/2013 | Noishiki et al. | |
| 2014/0213974 | A1* | 7/2014 | Scott | A61M 39/223 |
| | | | | 137/625.42 |
| 2017/0327880 | A1 | 11/2017 | Jones | |
| 2018/0188216 | A1 | 7/2018 | Olovsson | |
| 2019/0249787 | A1 | 8/2019 | Whitaker | |

FOREIGN PATENT DOCUMENTS

| | | | |
|---|---|---|---|
| CN | 111836986 | A | 10/2020 |
| EP | 3708531 | A1 | 9/2020 |

* cited by examiner

MULTI-COLUMN CHROMATOGRAPHY SYSTEMS WITH ROTATABLE VALVE ASSEMBLIES

CROSS-REFERENCE TO RELATED APPLICATIONS

This application is a National Stage Application filed under 35 U.S.C. § 371 of International Patent Application No. PCT/US2021/072812, filed Dec. 8, 2021, which claims benefit to U.S. Provisional Application No. 63/124,529, filed Dec. 11, 2020, which is incorporated herein by specific reference.

BACKGROUND OF THE INVENTION

1. The Field of the Invention

The present invention relates to multi-column chromatography systems and, more specifically, to multi-column chromatography systems having rotational valve assemblies embedded within a panel for controlling fluid flow throughout the system.

2. The Relevant Technology

Column chromatography systems are used in the separation of mixtures. For example, a feed stream that comprises a variety of different types of molecules can be flowed down through a chromatography column. A matrix housed within the column is specifically engineered to capture or slow the flow a particular molecule of interest while the remainder of the mixture can more freely flow through and out of the column. For example, the matrix can be a resin or type of filter. Once the molecule of interest has been captured within the column and the remainder of the mixture removed, an eluting fluid can be passed down the column which releases the molecule of interest from the matrix. The molecule of interest then flows out of the column for collection and subsequent processing. In some embodiments, a washing fluid followed by a regeneration fluid can then be passed down through the column so as to restore the original properties of the matrix which can then again be used to collect the molecule of interest from a feed stream.

Multi-column chromatography systems are designed to enable a continuous processing of the feed stream. For example, once a first column is filled with a molecule of interest, the feed stream is then transferred to a second column and then to subsequent other columns as needed. While the feed stream is being delivered to the other columns, the first column can be eluted, washed and restored. Once the first column is restored, the feed stream can then be returned to the first column. The same circular process is also performed with the other columns. Accordingly, as a result of using a multi-column system, the rate of processing of the feed stream is increased, relative to the use of a single column, because there is no downtime in processing of the feed stream.

Although multi-column chromatography systems are effective, they have a number of shortcomings. For example, multi-column chromatography systems can be very complex. Specifically, to ensure proper fluid flow into and out of each column, it is not uncommon for a large scale, multi-column chromatography system to be formed from over a hundred different tubes that are interconnected in a complex layout. In addition, each tube has a separate pinch valve mounted thereon for controlling the flow of fluid through the tube. Such systems are expensive to build, control, operate, and maintain.

Furthermore, such systems typically have a relatively large void volume. The void volume includes the volume insides the tubes and other conduits that are used to transfer fluids to, from, and between the columns. Having a large void volume can make it difficult to process smaller quantities of a feed stream and can result in larger waste of unprocessed or uncollected fluids that remain with the void volume of the tubing and conduits.

In addition, the operation of multi-column chromatography systems relies heavily on the use of sensors to determine when to switch between different fluid flows and when to switch flows to different locations. Such sensors can change depending on the feed source and the molecule of interest to be collected. In conventional systems, it can be difficult or impossible to switch out or replace sensors. Furthermore, the sensors are often positioned remote from the chromatography columns. As such, there can be a significant delay in determining properties of the fluid flowing out of the chromatography columns which can reduce performance and delay optimal switching between columns.

Accordingly, what is needed in the art are multi-column chromatography systems that solve all or some of the above-identified shortcoming or other deficiencies know in the art.

SUMMARY OF THE DISCLOSURE

In a first independent aspect of the present disclosure, a chromatography system includes:
- a plurality of chromatography columns;
- a panel having a top face and an opposing bottom face, a first cavity being formed on the panel so as to pass through the top face, the first cavity being encircled by an inner surface, the panel bounding:
  - an inlet fluid channel having a first end and an opposing second end, the second end of the inlet fluid channel terminating at an inlet opening formed on the inner surface encircling the first cavity so that the inlet fluid channel communicates with the first cavity; and
  - a plurality of first outlet fluid channels, each of the plurality of first outlet fluid channels having a first end and an opposing second end, the first end of each of the plurality of first outlet fluid channels terminating at an outlet opening formed on the inner surface encircling the first cavity so that each of the plurality of first outlet fluid channels communicate with the first cavity, a first one of the plurality of first outlet fluid channels being in fluid communication with a first one of the plurality of chromatography columns; and
- a first valve movably disposed within the first cavity, wherein moving the first valve to different positions produces isolated fluid communication between the inlet fluid channel and each of the plurality of first outlet fluid channels.

In an alternative embodiment, the first valve is rotatably disposed within the first cavity, and wherein rotating the first valve to different positions produces isolated fluid communication between the inlet fluid channel and each of the plurality of first outlet fluid channels.

In another embodiment, the panel comprises a first plate overlying and being secured to a second plate, the inlet fluid channel being at least partially bounded between the first plate and the second plate.

In another embodiment, the first plate has a bottom surface and the second plate has a top surface, an elongated channel groove being recessed into the bottom surface of the first plate or the top surface of the second plate, the channel groove comprising at least a portion of the inlet fluid channel.

In another embodiment, the first plate and the second plate are secured together by an adhesive or welding.

In another embodiment, a gasket disposed between the first plate and the second plate, the gasket at least partially bounding the inlet fluid channel.

In another embodiment, the panel is comprised of a polymer and has a thickness of at least 0.4 cm, 0.7 cm, 1 cm, 2 cm, or 3 cm.

In another embodiment, the panel is sufficiently rigid that it cannot bend over an angle of at least 40°, 60°, or 90° without plastic deformation.

In another embodiment, the panel comprises a first plate overlying and being secured to a second plate, each of the plurality of first outlet fluid channels being at least partially bounded between the first plate and the second plate.

In another embodiment, the panel comprises a first plate, a second plate, and a third plate secured together, the second plate being sandwiched between the first plate and the third plate.

In another embodiment, at least one of the plurality of first outlet fluid channels is at least partially bound between the first plate and the second plate and wherein the inlet fluid channel is at least partially bounded between the second plate and the third plate.

In another embodiment, the inlet fluid channel passes through the second plate so as to communicate with the first plate and the second plate.

Another embodiment further includes:

a second cavity being formed on and passing through the top face of the panel and encircled by an inner surface;

the second end of the first one of the plurality of first outlet fluid channels terminating at an inlet opening formed on the inner surface encircling the second cavity so that the first one of the plurality of first outlet fluid channels communicate with the second cavity;

a second valve is movably disposed within the second cavity; and a plurality of second outlet fluid channels being bounded within the panel and each having a first end and an opposing second end, the first end of each of the plurality of second outlet fluid channels terminating at an outlet opening formed on the inner surface encircling the second cavity so that each of the plurality of second outlet fluid channels communicate with the second cavity.

In another embodiment, a second valve is rotatably disposed within the second cavity.

In another embodiment, the first one of the plurality of chromatography columns houses a matrix that is designed for capturing a molecule of interest, the inlet fluid channel being in communication with:

a feed liquid comprising the molecule of interest;

an eluting liquid designed for separating the molecule of interest from the matrix of the first one of the plurality of chromatography columns; or a regeneration liquid for the matrix of the first one of the plurality of chromatography columns.

In another embodiment, an actuator is coupled with the first valve, the actuator being configured to selectively move the first valve.

In another embodiment, an actuator is coupled with the first valve, the actuator being configured to selectively rotate the first valve.

In another embodiment, the actuator is further configured to selectively depress and release the first valve.

In another embodiment, a central processing unit (CPU) is in electrical communication with the actuator and is programmed to automatically control operation of the actuator.

In another embodiment, a sensor block is removably mounted on the panel and is in fluid communication with an outlet of the first one of the plurality of chromatography columns, the sensor block comprising one or more sensors configured to detect properties of a fluid.

In another embodiment, the sensor block comprises at least one of a conductivity sensor, ultraviolet light (UV) sensor, pressure sensor or temperature sensor.

In another embodiment, at least a portion of the first cavity extends entirely through the panel between the top face and the opposing bottom face.

In a second independent aspect of the present disclosure, a chromatography system includes:

a first chromatography column having an inlet and an outlet;

a panel having a top face and an opposing bottom face, a first cavity being formed on the panel so as to pass through the top face, the first cavity being encircled by an inner surface, the panel bounding:

an inlet fluid channel having a first end and an opposing second end, the second end of the inlet fluid channel terminating at an inlet opening formed on the inner surface encircling the first cavity so that the inlet fluid channel communicates with the first cavity, the inlet fluid channel being in fluid communication with the outlet of the first chromatography column; and a plurality of first outlet fluid channels, each of the plurality of first outlet fluid channels having a first end and an opposing second end, the first end of each of the plurality of first outlet fluid channels terminating at an outlet opening formed on the inner surface encircling the first cavity so that each of the plurality of first outlet fluid channels communicate with the first cavity;

a first valve movably disposed within the first cavity, wherein moving the first valve to different positions produces isolated fluid communication between the inlet fluid path and each of the plurality of first outlet fluid channels; and a sensor block removably mounted on the panel and being in fluid communication with the inlet fluid channel so that fluid flowing from the outlet of the first chromatograph column to the inlet opening formed on the inner surface of the panel must pass through the sensor block, the sensor block comprising one or more sensors configured to detect properties of a fluid.

In an alternative embodiment, the first valve is rotatably disposed within the first cavity, wherein rotating the first valve to different positions produces isolated fluid communication between the inlet fluid path and each of the plurality of first outlet fluid channels.

In another embodiment, the sensor block is removably received within a slot formed on the top surface of the panel.

In another embodiment, a connector is removably securing the sensor block the panel.

In another embodiment, the sensor block is in direct fluid communication with the inlet fluid channel bounded within the panel.

In another embodiment, the sensor block comprises at least one of a conductivity sensor, ultraviolet light (UV) sensor, pressure sensor or temperature sensor.

In another embodiment, the panel comprises a first plate overlying and being secured to a second plate, the inlet fluid channel being at least partially bounded between the first plate and the second plate.

In another embodiment, the panel comprises a first plate, a second plate, and a third plate secured together, the second plate being sandwiched between the first plate and the third plate.

In another embodiment, at least one of the plurality of first outlet fluid channels is at least partially bound between the first plate and the second plate and wherein the inlet fluid channel is at least partially bounded between the second plate and the third plate.

Another embodiment further includes:

a second cavity formed on the panel so as to pass through the top face, the second cavity being encircled by an inner surface;

the second end of a first one of the plurality of first outlet fluid channels terminating an inlet opening formed on the inner surface encircling the second cavity so that the first one of the plurality of first outlet fluid channels communicate with the second cavity;

a second valve rotatably disposed within the second cavity; and a plurality of second outlet fluid channels being bounded within the panel and each having a first end and an opposing second end, the first end of each of the plurality of second outlet fluid channels terminating at an outlet opening formed on the inner surface encircling the second cavity so that each of the plurality of second outlet fluid channels communicate with the second cavity.

Another embodiment further includes:

a second chromatography column having an inlet and an outlet; and a first one of the plurality of second outlet fluid channels being in fluid communication with the inlet of the second chromatography column.

It is understood that each of the independent aspects recited herein may include any of the features, options and possibilities recited in association with the other independent aspects set forth above or as recited elsewhere within this document.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Figure 1A:
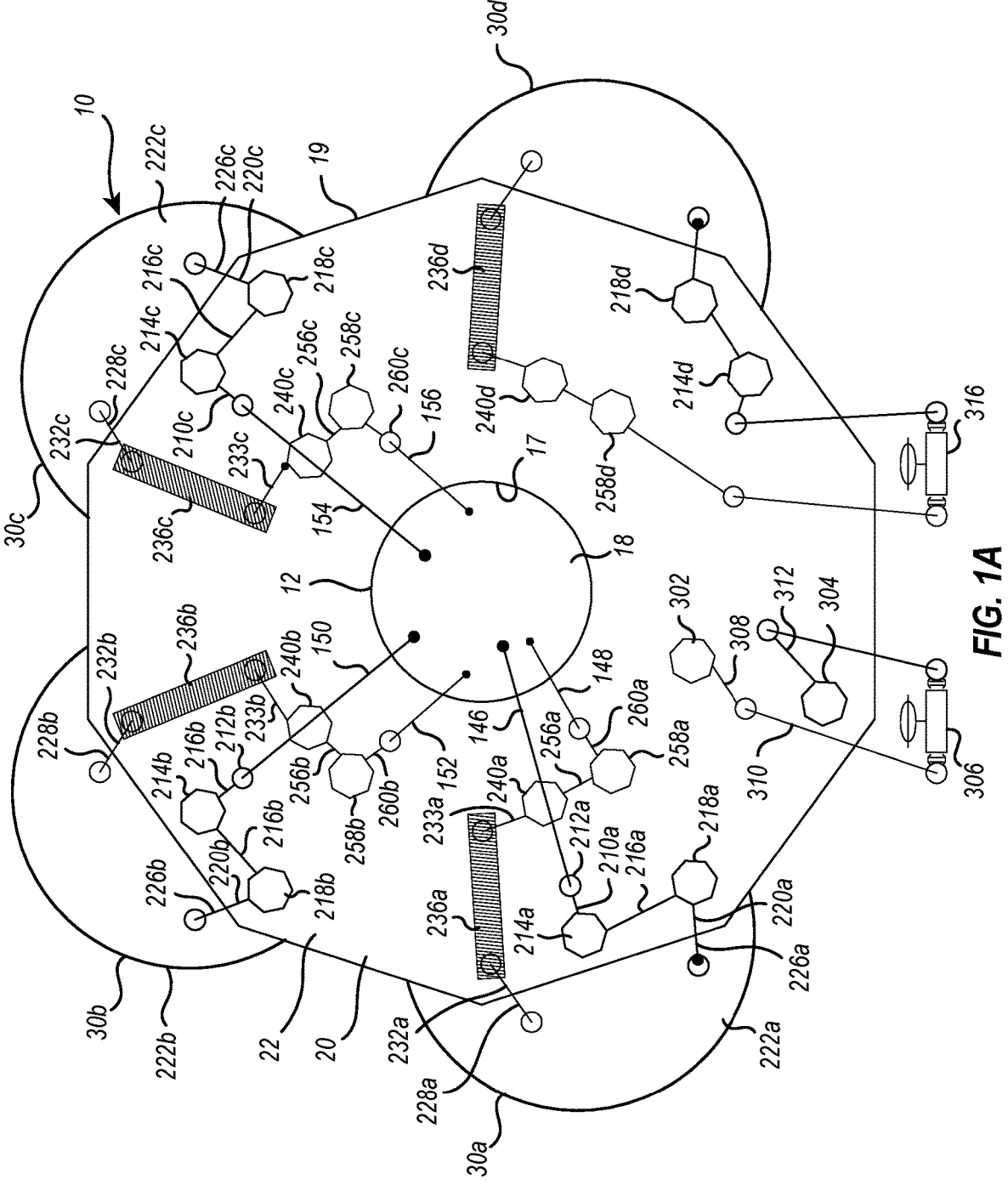
FIG. 1A is a schematic top plan view of a chromatography system.

Before describing the present disclosure in detail, it is to be understood that this disclosure is not limited to particularly exemplified apparatus, systems, methods, or process parameters that may, of course, vary. It is also to be understood that the terminology used herein is only for the purpose of describing particular embodiments of the present disclosure and is not intended to limit the scope of the disclosure in any manner.

All publications, patents, and patent applications cited herein, whether supra or infra, are hereby incorporated by reference in their entirety to the same extent as if each individual publication, patent, or patent application was specifically and individually indicated to be incorporated by reference.

The term "comprising" which is synonymous with "including," "containing," or "characterized by," is inclusive or open-ended and does not exclude additional, unrecited elements or method steps.

It will be noted that, as used in this specification and the appended claims, the singular forms "a," "an" and "the" include plural referents unless the content clearly dictates otherwise. Thus, for example, reference to a "partition" includes one, two, or more partitions.

As used in the specification and appended claims, directional terms, such as "top," "bottom," "left," "right," "up," "down," "upper," "lower," "proximal," "distal" and the like are used herein solely to indicate relative directions and are not otherwise intended to limit the scope of the disclosure or claims.

Where possible, like numbering of elements have been used in various figures. Furthermore, multiple instances of an element and or sub-elements of a parent element may each include separate letters appended to the element number. For example, two instances of a particular element "10" or two alternative embodiments of a particular element may be labeled as "10a" and "10b". In that case, the element label may be used without an appended letter (e.g., "10") to generally refer to all instances of the element or any one of the elements. Element labels including an appended letter (e.g., "10a") can be used to refer to a specific instance of the element or to distinguish or draw attention to multiple uses of the element. Furthermore, an element label with an appended letter can be used to designate an alternative design, structure, function, implementation, and/or embodiment of an element or feature without an appended letter. Likewise, an element label with an appended letter can be used to indicate a sub-element of a parent element. For instance, an element "12" can comprise sub-elements or surfaces "12a" and "12b."

Various aspects of the present devices and systems may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present. Furthermore, as used herein, the terms "connection," "connected," and the like do not necessarily imply direct contact between the two or more elements.

Various aspects of the present devices, systems, and methods may be illustrated with reference to one or more exemplary embodiments. As used herein, the term "embodiment" means "serving as an example, instance, or illustration," and should not necessarily be construed as preferred or advantageous over other embodiments disclosed herein.

Unless defined otherwise, all technical and scientific terms used herein have the same meaning as commonly understood by one of ordinary skill in the art to which the present disclosure pertains. Although a number of methods and materials similar or equivalent to those described herein can be used in the practice of the present disclosure, the preferred materials and methods are described herein.

Figure 2:
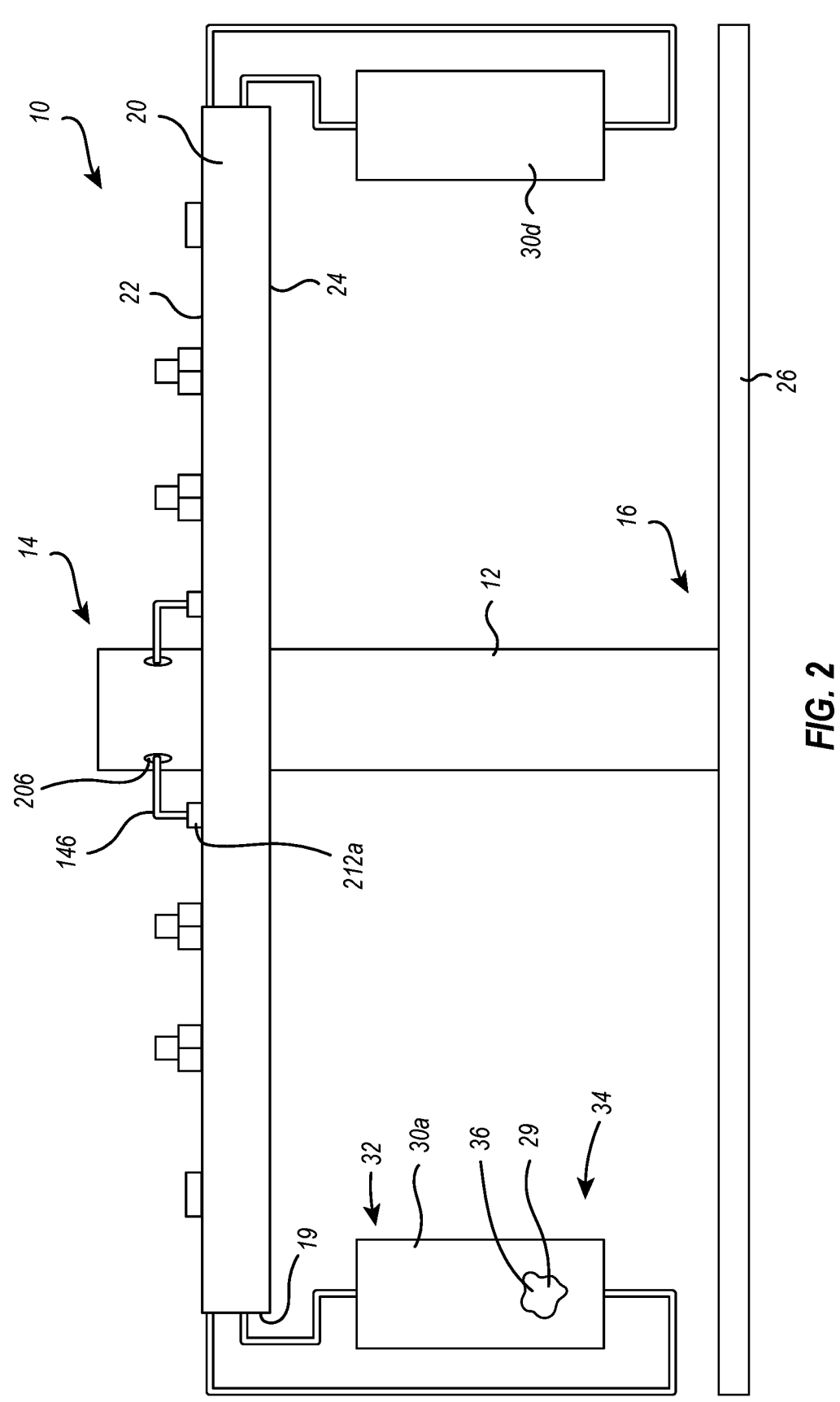
FIG. 2 is schematic elevated side view of the chromatography system shown in FIG. 1A.

Depicted in FIGS. 1A and 2 are schematic drawings of a chromatography system 10 incorporating features of the present disclosure. In general, chromatography system 10 is designed to separate a mixture so as to isolate and collect a molecule(s) of interest from the mixture. FIG. 1A is a top plan view of chromatography system 10 while FIG. 2 is an elevated side view thereof. In general, chromatography system 10 comprises a stand 12 having an upper end 14 and an opposing lower end 16. Secured to upper end 14 of stand 12 is a panel 20 having a top surface 22 and an opposing bottom surface 24. In one embodiment, stand 12 comprises a tubular column having an interior surface 17 that bounds a channel 18 that extends at least partially along the length thereof. In this embodiment, stand 12 can centrally extend through panel 20 so that panel 20 radially outwardly projects from stand 12 to an annular perimeter edge 19. Stand 12 can be configured to independently support panel 20 and can have an enlarged base 26 secured to lower end 16. Base 26 can comprise an enlarged platform, a cart, or some other stabilizing structure. In alternative embodiments, stand 12 can comprise at least 1, 2, 3, 4, 5, or 6 spaced apart columns that connect to and support panel 20. In such other embodiments, stand 12 or the columns thereof need not centrally extend through panel 20 but could be secured at perimeter edge 19 or at other locations of panel 20. In the depicted embodiment, stand 12 is shown as being horizontally disposed. In alternative embodiments, stand 12 can be angled relative to horizontal and in other embodiments can vertically disposed, i.e., angled 90° relative to horizontal.

Chromatography system 10 further comprises a plurality of chromatography columns 30. In the depicted embodiment, the plurality of chromatography columns 30 comprises chromatography columns 30a, 30b, 30c, and 30d. In alternative embodiments, chromatography system 10 can comprise other numbers of chromatograph columns such as at least 1, 2, 3, 4, 5, 6, 7, or 8 separate chromatograph columns or in a range between any two of the foregoing numbers. Each chromatography column 30 has an upper end 32 where an inlet is located and an opposing lower end 34 where an outlet is located. Each chromatography column 30 also has an interior 36 in which a chromatography matrix 29 is disposed.

As is known in the art, chromatography matrix 29 can have a variety of different compositions and/or configuration and is selected or engineered for each use to capture or slow a molecule of interest from a mixture within a feed steam while the remainder of the feed stream can more freely pass through chromatography matrix 29. By way of example and not by limitation, chromatography matrix 29 can comprise a resin or type of filter, such as a porous membrane, that are designed to bind the molecule of interest. In more specific embodiments, chromatography matrix 29 can comprise an ion exchange resin or membrane or a hydrophobic or hydrophilic resin or membrane. In alternative embodiments, as discussed further below, chromatography matrix 29 can be selected so that only the molecule of interest and a related carrier fluid can pass through column 30 while the remaining contaminates within the feed stream are retained within column 30.

In one embodiment, each of chromatography column 30a-30d can comprise the same matrix 29. In other embodiments, one or more of chromatography columns 30a-30d can have a different matrix 29 than the other columns. In one embodiment, chromatography columns 30a-30d are vertically orientated along a longitudinal axis and are disposed below panel 20. More, specifically, chromatography columns 30a-30d can be disposed between panel 20 and base 26 and can be supported by panel 20, stand 12 and/or base 26. Although not required, in one embodiment, chromatography columns 30a-30d can be vertically aligned with perimeter edge 19 of panel 20 and be equally spaced apart around perimeter edge 19.

With continued reference to FIG. 1A, chromatography system 10 further comprises a feed line 146, a load waste line 148, an elute/wash line 150, a product line 152, a regeneration line 154, and a regeneration waste line 156. Feed line 146, elute/wash line 150 and regeneration line 154 are examples of delivery lines that deliver a fluid through panel 20 to a corresponding chromatography column 30. In contrast, load waste line 148, product line 152, and regeneration waste line 156 are examples of return lines that receive a fluid from panel 20 after the fluid has passed through one or more of chromatography columns 30.

Figure 3:
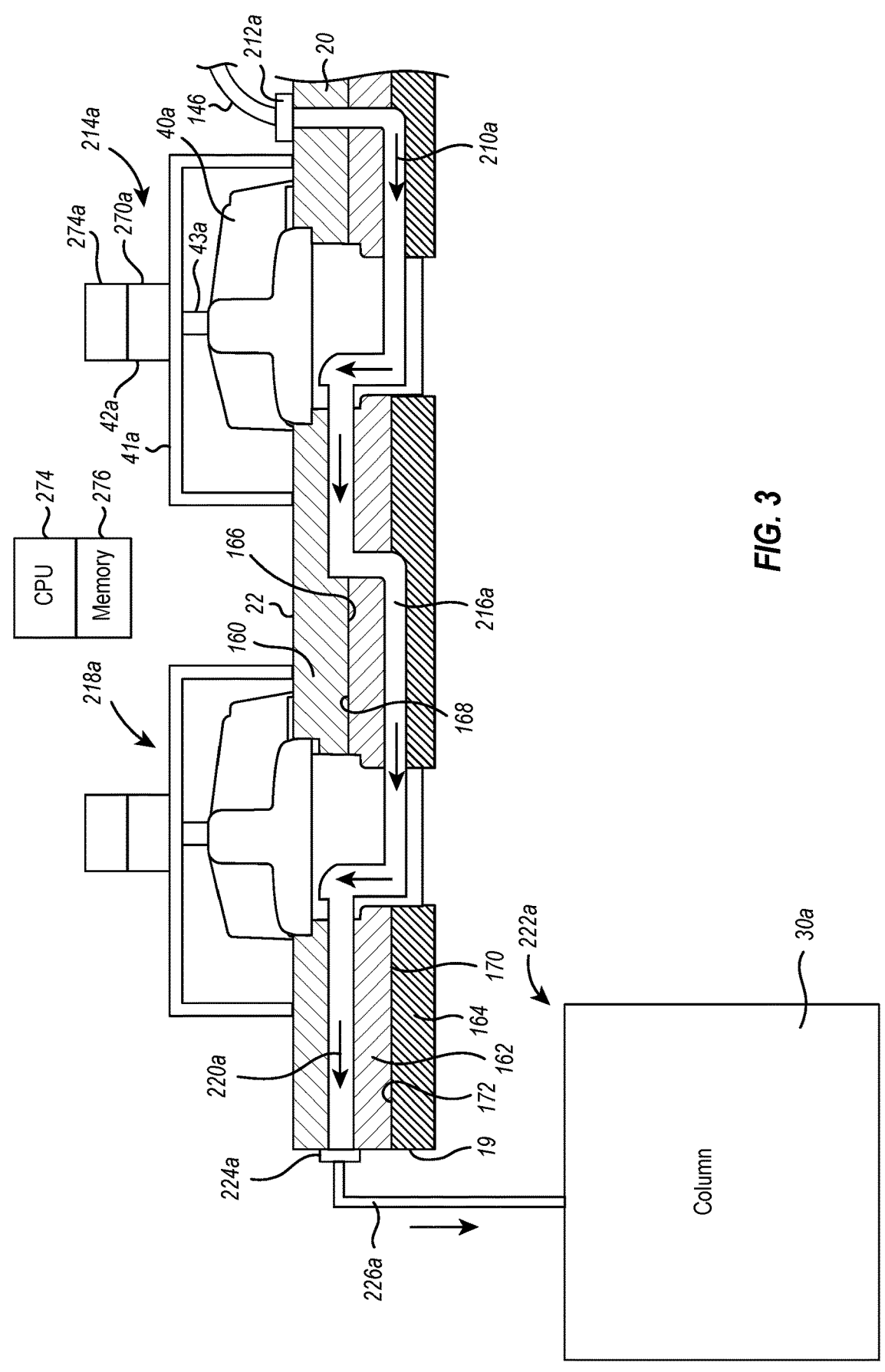
FIG. 3 is an elevated side view of an outflow portion of the chromatography system shown in FIG. 2 where the panel is shown in cross section.

Chromatography system 10 also comprises a plurality of fluid channels that are bound within panel 20 and a plurality of valve assemblies that are rotatably disposed on panel 20. In part, the fluid channels function to: 1) deliver fluid from a delivery line to a chromatography column 30, 2) transfer fluid between different chromatography columns 30, and/or 3) transfer fluid from a chromatography column 30 to a return line. The valve assemblies function to control the flow of fluid through the fluid channels. For example, as depicted in FIG. 3, panel 20 comprises a first plate 160, a second plate 162, and a third plate 164 with second plate 162 being sandwiched between first plate 160 and third plate 164. First plate 160 has top surface 22 and an opposing bottom surface 166. Second plate 162 has a top surface 168 and an opposing bottom surface 170. Likewise, third plate 164 has a top surface 127 and opposing bottom surface 124. Although not required, in one embodiment, the top surface and bottom surface of each of plates 160, 162, and 164 are planar and are disposed in parallel alignment. Furthermore, each plate 160, 162, and 164 can have a thickness extending between corresponding top surface and bottom surface that is at least or less than 0.3 cm, 0.5 cm, 0.8 cm, 1 cm, 1.5 cm, 2 cm, 2.5 cm, 3 cm, or 4 cm or in a range between any two of the foregoing.

Each of the different plates can have the same thickness or a different thickness. In addition, the thickness of each plate can very, especially dependent upon surface features formed thereon. Plates 160, 162, and 164 are commonly made from a substantially rigid polymer, co-polymer, polymeric material, such as polycarbonate, Poly(methyl methacrylate), polypropylene, or polyvinylidene fluoride (PVDF). Other polymers can also be used. In one embodiment, a coating can be applied to the plates. For example, the plates can be coated with polytetrafluoroethylene (PTFE). Common polymers that are use are thermoplastics. In alternative embodiments, other materials can be used such as glass, metal, or composites. It is commonly desired to form plates 160, 162, and 164 from a translucent material so that the flow of fluid through the fluid channels bound therein can be easily inspected. However, opaque materials can also be used, such as for processing liquids that are light sensitive.

Figures 4, 5, 6, 7:
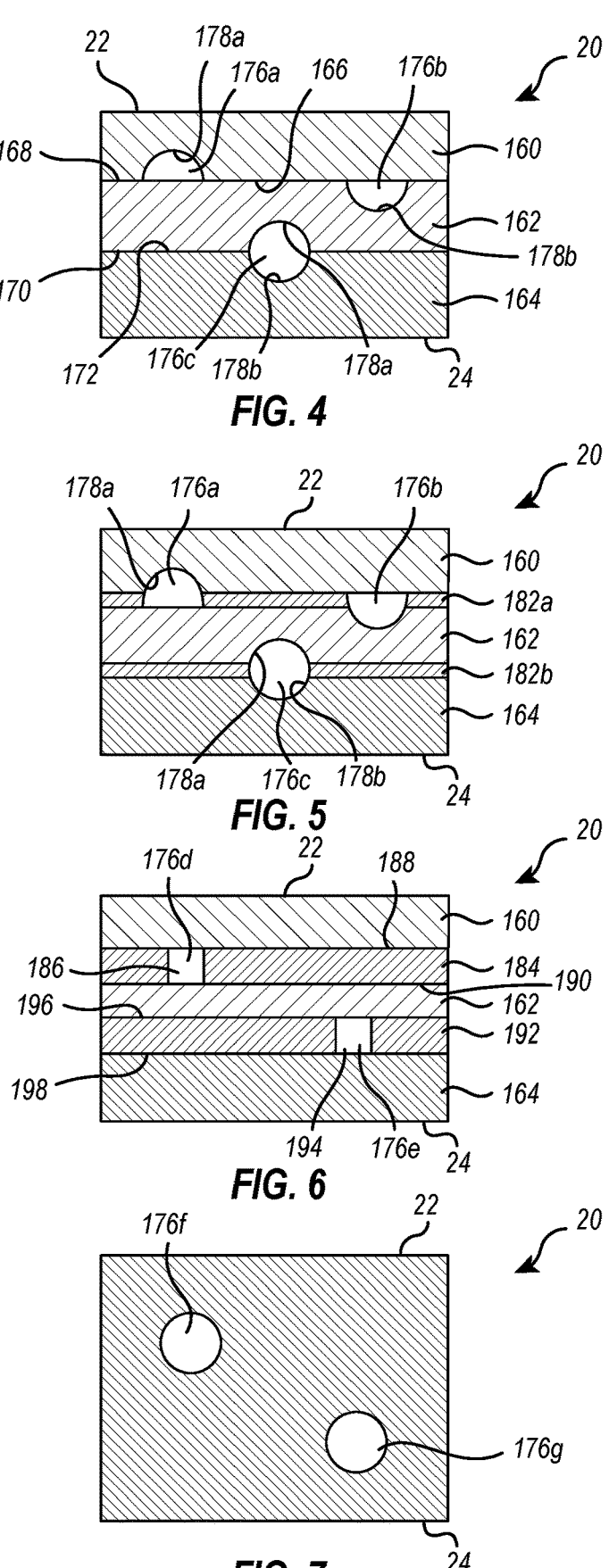
FIG. 4 is a cross sectional end view of the panel shown in FIG. 3 showing alternative embodiments of fluid channels.
FIG. 5 is a cross sectional end view of the panel shown in FIG. 3 showing alternative embodiments of fluid channels wherein gaskets are disposed between the plates of the panel.
FIG. 6 is a cross sectional end view of the panel shown in FIG. 3 showing alternative embodiments of fluid channels by adding alternative gaskets or plates.
FIG. 7 is a cross sectional end view of the panel shown in FIG. 3 wherein the panel is integrally formed by 3-D printing.

The fluid channels bound within panel 20 can be formed in a variety of different ways. For example, as depicted in FIG. 4, a fluid channel 176a can be formed by forming an elongated channel groove 178a on bottom surface 166 of first plate 160 and then securing bottom surface 166 of first plate 160 to top surface 168 of second plate 162, thereby bounding channel groove 178a between plates 160 and 162 so as to form fluid channel 176a. In this embodiment, plates 160 and 162 are bound together so as to form a liquid tight seal therebetween. For example, plates 160 and 162 can be bound together by an adhesive, welding or through other conventional techniques. Although channel groove 178a is formed having a semi-circular transverse cross section, other configurations having a desired cross-sectional area can also be used.

In an alternative embodiment, a fluid channel 176b can be formed by forming an elongated channel groove 178b on top surface of second plate 162. Bottom surface 166 of first plate 160 is then secured to top surface 168 of second plate 162, as discussed above, thereby bounding channel groove 178b between plates 160 and 162 so as to form fluid channel 176b. In yet another alternative embodiment, elongated channel grooves 178a and 178b can be aligned to form a fluid channel. For example, elongated channel groove 178a can be formed on bottom surface 170 of second plate 162 while elongated channel groove 178b can be formed on top surface 172 of third plate 164. Bottom surface 170 of second plate 162 is then secured to top surface 172 of third plate 164, as discussed above, so that channel grooves 178a and 178b are aligned, thereby forming a fluid channel 176c. The channel grooves can be formed by cutting the grooves into the plates or by initially forming the plates so as to have the channel grooves formed thereon, such as by molding or 3-D printing the plates with the channel grooves.

Turing to FIG. 5, in a further alternative embodiment to fluid channel 176a-176c, the alternative channel grooves 178a and 178b can be formed as shown in FIG. 4. However, in this embodiment, a first gasket 182a is positioned between first plate 160 and second plate 162 while a second gasket 182b is positioned between second plate 162 and third plate 164. Gaskets 182 form a sealed engagement between plates 160, 162, and 164 and thereby prevent leaking of fluid channels 176. Gaskets 182 are typically made from a material that is different from the material used to form plates 160, 162, and 164. In one embodiment, gaskets 182 are formed from a material having a greater elasticity than the material used to form plates 160, 162, and 164 and in one embodiment is made from an elastomeric material. Other materials that will not leach into the fluid flowing through the fluid channels and can form the desired seal can also be used.

Turning to FIG. 6, in another alternative embodiment, fluid channels can be formed without the need to recess channel groves into one or more of the plates. For example, a fourth plate 184 can be sandwiched between two of the other plates, such as between first plate 160 and second plate 162. Fourth plate 184 has an elongated slot 186 that extends along fourth plate 184 and passes between a top surface 188 and an opposing bottom surface 190 thereof. First plate 160 is secured to top surface 188 of fourth plate 184, such as by welding or adhesive, while second plate 162 is secured to bottom surface 190 of fourth plate 184, thereby bounding slot 186 between first plate 160 and second plate 162 so as to form a fluid channel 176d. In this embodiment, fourth plate 184 can be made of the same material as the other plates. FIG. 6 also such a further alternative where a gasket 192 having an increased thickness is disposed between second plate 162 and third plate 164. Gasket 192 bounds a slot 194 that extends along gasket 192 and passes between a top surface 196 and an opposing bottom surface 198 thereof. Gasket 192 is sandwiched between second plate 162 and third plate 164 so as to bound slot 194 between second plate 162 and third plate 164 and thereby form a fluid channel 176e. In this embodiment, gasket 192 can be made from a different material than the other plates 160, 162, and/or 164 and can be made of material such as previously discussed with regard to gaskets 182.

Turing to FIG. 7, in another alternative embodiment, it is appreciated that panel 120 need not be made of separate plates that are secured together. Rather, panel 120 can be formed as a single, integral, unitary structure that bounds any number or layout of fluid channels such as fluid channels 176f and 176g. Panel 20 shown in FIG. 7 can be formed using conventional 3-D printing techniques. Independent of the method or structure used to form the fluid channels within panel 20, in one alternative embedment, a coating can be applied to the interior surfaces of panel 20 that are bounding the fluid channels. The coating can be designed to inhibit the molecule of interest from binding on the interior surface of panel 20, thereby improving collection yield of the molecule of interest. For example, in one embodiment the interior surfaces of panel 20 that are bounding the fluid channels can be coated to polytetrafluoroethylene (PTFE). Other applicable coatings can also be used.

Figure 8:
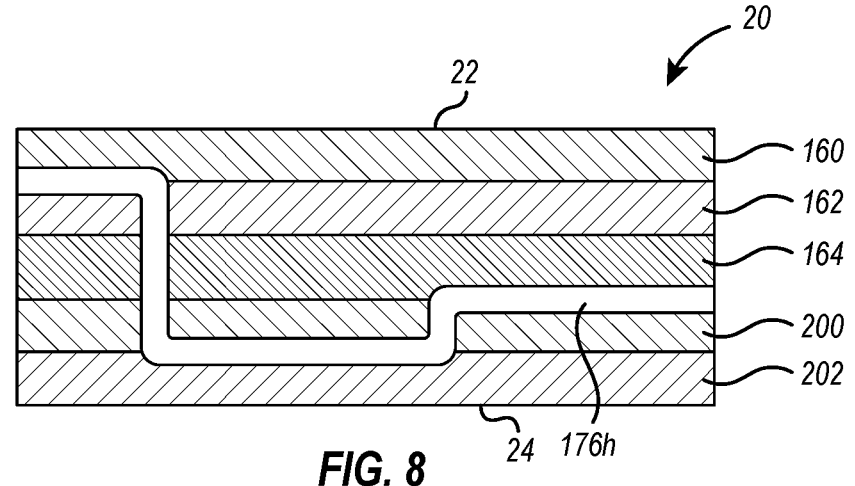
FIG. 8 is a cross sectional side view of the panel shown in FIG. 3 having additional plates with a fluid channel passing therethrough.

Although the primary embodiments disclosed within the present application show forming panel 20 using plates 160, 162, and 164, it is appreciated that panel 20 and the related fluid channels can be formed using any of the configuration or techniques disclosed herein or any combination of the foregoing. Furthermore, as discussed below in more detail, panel 20 is formed in one embodiment from three stacked plates 160, 162, and 164 because it permits fluid channels to be formed long two horizontal planes that are vertically spaced apart. This permits a greater concentration of the fluid channels and a greater versatility in path layout. However, in alternative embodiments, depending in part and the desired flow path and the number of chromatograph columns being used, panel 20 can be formed with any desired number of stacked plates. For example, panel 20 be made with at least 2, 3, 4, 5, 6, 7, or 8 stacked plates or have a range between any two of the foregoing numbers. For example, as depicted in FIG. 8, panel 20 can be made with five stacked plates 160, 162, 164, 200, and 202 and bounding fluid channel 176h. As depicted, fluid channel 176h, along with the other fluid channels disclosed herein can be bound to extend horizontally between any two desired plates and can extend vertically up and/or down so as to transition between any other two adjacently disposed plates.

In one embedment, the final panel 20 typically has a thickness extending between top surface 22 and bottom surface 24 that is at least 1 cm, 1.5 cm, 2 cm, 2.5 cm, 3 cm, 4 cm, or 5 cm or is in a range between any two of the foregoing values. Furthermore, panel 20 is sufficiently rigid so that it cannot be bent over an angle of greater than 40°, 60°, 90° without plastic deformation.

Returning to FIG. 1A, the fluid channels and valve assemblies can be organized and placed in a variety of different ways/locations on panel 20. The number and organization depends, in part, upon the number of chromatography columns 30 being used and the desired processing through chromatography columns 30. However, in the depicted embodiment, each delivery line 146, 150, and 154 is fluid coupled in series to two delivery valve assemblies and each return line 148, 152, 156 is fluid couple in series to two return valve assemblies.

For example, feed line 146 fluid couples upstream to a feed source housing a feed liquid. The feed liquid comprises a mixture that includes a molecule(s) of interest. In one embodiment, the feed liquid can comprise a clarified cell broth, buffer, cell culture media or the like in which the molecule of interest and, typically, other undesired components are disposed. Another example of a feed liquid can include a lysate or an Adeno-Associated Virus (AAV) in liquid suspension. The molecule of interest commonly comprises a protein, although other molecules can also be selected.

In one embedment, feed line 146 travels up through channel 18 within stand 12 and passes out of stand 12 such as through an opening 206 shown in FIG. 2. In alternative embodiments, feed line 146 and the other lines discussed herein as passing through channel 18 can travel outside of stand 12, such as along the outer surface thereof, so as to facilitate easy replacement between different runs. As shown in FIG. 3, a terminal end of feed line 146 then fluid couples with a fluid channel 210a of panel 20 through a connector 212a. Feed line 146 is typically comprised of a flexible conduit, such as a flexible, polymeric tubing. In one embodiment, such tubing can be bent over an angle at least 180° without plastic deformation. Other conduits, such as rigid conduits, can also be used. With reference to FIGS. 1A and 3, fluid channel 210a extends from connector 212a to a first delivery valve assembly 214a. The configuration and operation of the valve assemblies will be discussed below in greater detail. A fluid channel 216a within panel 20 extends from first delivery valve assembly 214a to a second delivery valve assembly 218a. In turn, a fluid channel 220a extends from second delivery valve assembly 218a and is fluid coupled with an inlet end 222 of chromatography column 30a. More specifically, fluid channel 220a extends to a connector 224a disposed on panel 20, such as on perimeter edge 19. A conduit 226a, disposed outside of panel 20, extends from connector 224a to inlet end 222a of chromatography column 30a. Conduit 226a can comprise a flexible conduit, such as a flexible, polymeric tubing. In one embodiment, such tubing can be bent over an angle at least 180° without plastic deformation. Other conduits, such as rigid conduits, can also be used.

Figure 9:
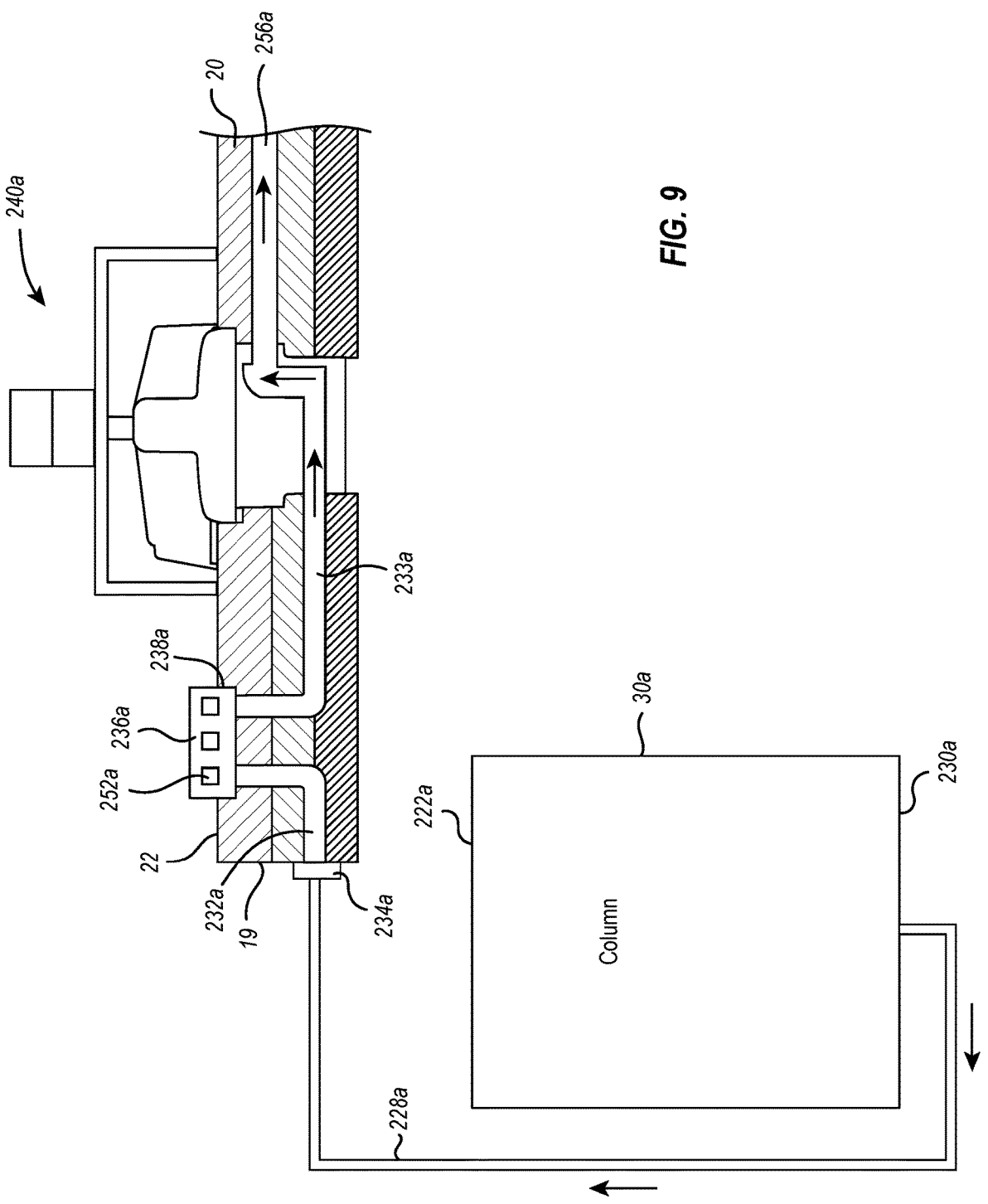
FIG. 9 is a partial cross-sectional side view of an outflow portion of the chromatography system shown in FIG. 2 including a sensor block.

Turning now to FIGS. 1A and 9, a conduit 228a has a first end fluid coupled with an outlet end 230a of chromatography column 30a and an opposing second end fluid coupled with a fluid channel 232a of panel 20. This fluid coupling can be through a connector 234a on panel 20. Connector 234a can be disposed at perimeter edge 19 of panel 20 or at other locations. Fluid channel 232a couples with an inlet of a sensor block 236a. A fluid channel 233a within panel 20 couples with an outlet end of sensor block 236a and extends to a first return valve assembly 240a. Conduit 228a, along with other conduits disclosed herein, can be made of the same materials and have the properties as conduit 226a, as discussed above. In some embodiments, all conduits of the inventive systems can be made of the same material while in other embodiments, some conduits made be made of different material, depending on their intended use.

Figure 10:
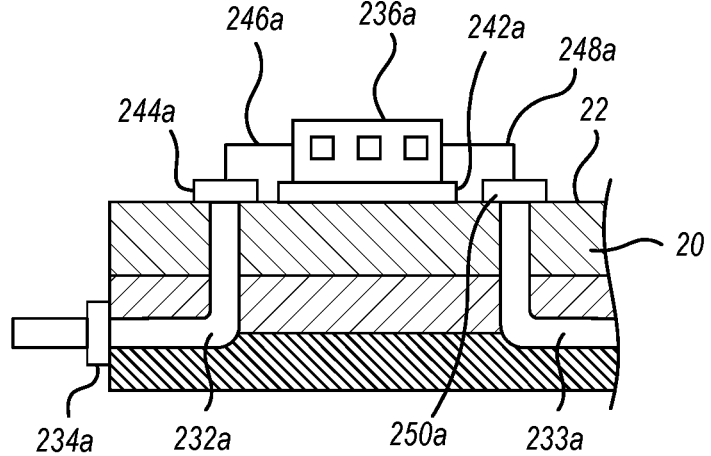
FIG. 10 is a partial cross-sectional side view of an alternative embodiment of the outflow portion of the chromatography system shown in FIG. 9.

Sensor block 236a is typically designed to be removably coupled to panel 20. For example, in one embodiment, sensor block 236a is received within a slot 238a formed on top surface 22 of panel 20, such as through a snap fit connection, so as to form a fluid coupling with fluid channels 232a and 233a. Alternatively, sensor block 236a may simply be removably mounted to top surface 22 of panel 20 through a connector such as a clamp, tri-clamp, fastener, spring or the like, so as to fluid couple with fluid channels 232a and 233a. In one embodiment, the fluid coupling can be achieved through aseptic connections. In another alternative embodiment, as depicted in FIG. 10, sensor block 236a couples to panel 20 either through a connector 242a or by being secured within slot 238a as shown in FIG. 9. However, in this embodiment, fluid channel 232a extends to a fluid coupler 244a on panel 20, such as on top surface 22, and a conduit 246a extends from fluid coupler 244a to the inlet of sensor block 236a. In turn a conduit 248a extends from an outlet of sensor block 236 and is fluid coupled with fluid channel 233a through a fluid coupler 250a disposed on panel 20. Conduits 246a and 248a can be made of the same alternative materials as conduit 228a, as previously discussed. In one further alternative embodiment, the second end of conduit 228a (FIG. 9) can be directly coupled to the inlet end of sensor block 236a so as to eliminate the need for fluid channel 232a.

As shown in FIG. 9, sensor block 236a comprises one or more sensors 252a that detect properties of the fluid exiting chromatography column 30a including detecting the presence of the molecule of interest. For example, sensors 252a can comprise a conductivity sensor, ultraviolet light (UV) sensor, pressure sensor, temperature sensor, pH sensor, multiple UV sensors or other sensors. In one embodiment, sensor block 236a can comprise at least 1, 2, 3, 4, or 5 separate sensors or in a range between any two of the foregoing numbers. Sensor block 236a is typically designed to be removably mounted to panel 20 so that sensor block 236a can be easily removed and replaced with a new sensor block for each new run. The new sensor block 236a can have the same sensor(s) 252a or can have one of more different sensors 252a depending on the intended use. Likewise, prior to use, a sensor block 236a can be selected from a plurality of different sensors blocks 236a, such as at least 2, 3, 4, 5, 6, where each sensor block has one or more different sensors than the other sensors blocks. The selected sensor block can then be easily mounted to panel 20 for operation. In view of the foregoing, the disclosed sensor blocks thus provide the advantage that they are easily replaced, easily secured, provide improved versatility in use, minimize void space, are proximate to the chromatography column outflow for efficient and timely processing and movement of the fluid and have other advantages. However, in alternative embodiments where there is no need to replace the sensors 252a, one or more of sensors 252a can be permanently mounted on panel 20. For example, some sensor 252a, such as reusable sensors, may be permanently mounted on panel 20 while other sensors 252a are removably mounted on panel 20.

Figure 11:
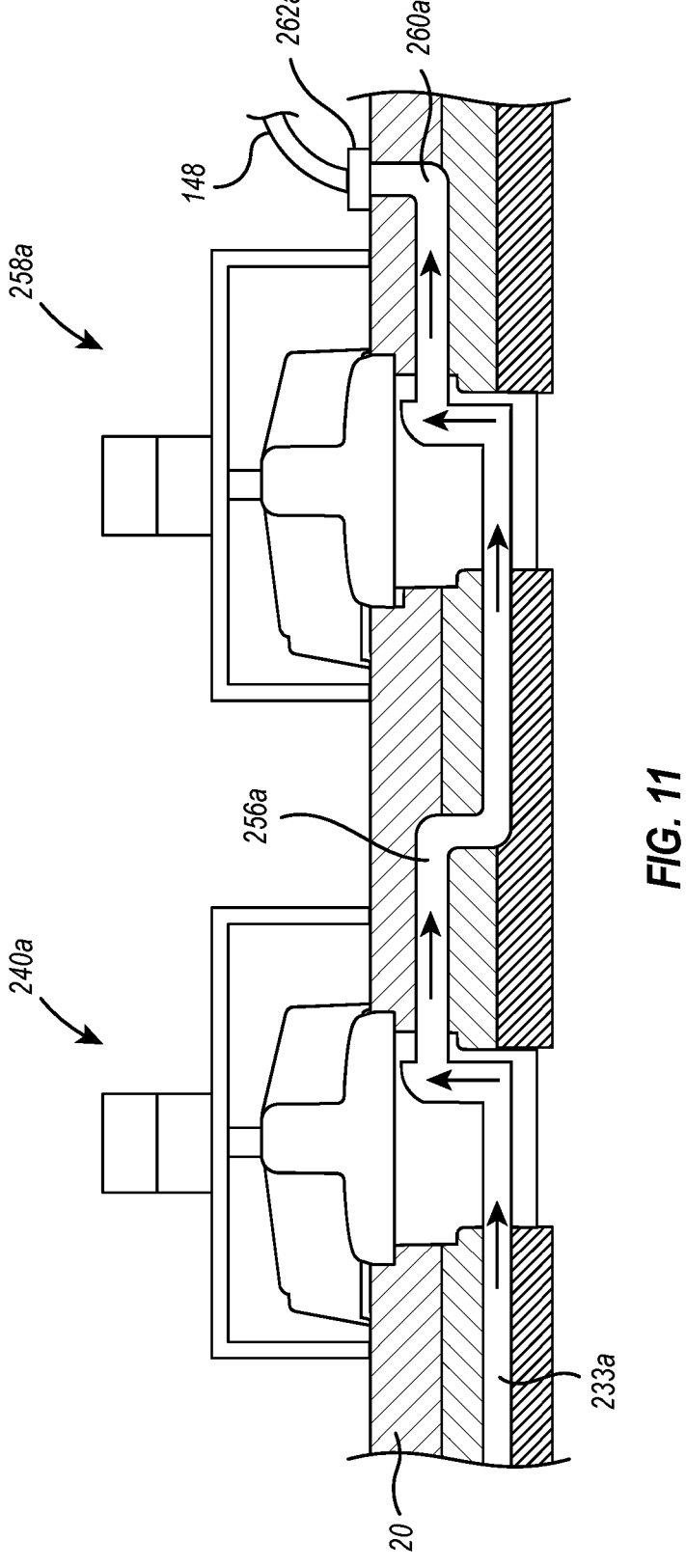
FIG. 11 is a partial cross-sectional side view of an outflow portion of the chromatography system shown in FIG. 2 extending between two valve assemblies.

Turning to FIGS. 1A and 11, a fluid channel 256a within panel 20 extends from first return valve assembly 240a to a second return valve assembly 258a. In turn, a fluid channel 260a extending from second return valve assembly 258a fluid couples with load waste line 148 through a fluid coupler 262a. Load waste line 148 can comprise the same type of conduit as feed line 146 and can, in one embodiment, extend down channel 18 of stand 12 where it eventually couples with a receptacle for receiving load waste.

The same conduits, fluid channels, valve assemblies, sensor block, and alternative for the above described circuit extending from feed line 146 to load waste line 148 can be used to form a circuit extending from elute/wash line 150 to product line 152 and from regeneration line 154 to regeneration waste line 156. Like elements of the circuits extending between lines 146 and 148, between lines 150 and 152 and between lines 154 and 156 are all identified by like reference characters except that the reference characters for the elements of the circuit extending between lines 150 and 152 include the suffix letter "b" and the elements of the circuit extending between lines 154 and 156 include the suffix letter "c." For example, with reference to FIG. 1A, elute/wash line 150 fluid couples with chromatography column 30b through first delivery valve assembly 214b and second delivery valve assembly 218b while the fluid exiting chromatography column 30b passes through sensor block 236b, first return valve assembly 240b and second return valve assembly 258b before communicating with product line 152. Elute/wash line 150 can pass through channel 18 of stand 12 and fluid couple upstream with a source of eluting fluid and with a washing fluid. Eluting fluids typically comprise a buffer or purified water. One common example of a buffer used as an eluting fluid is 50 mM acetic acid. Other buffers can also be used. Examples of washing fluids can include phosphate and NaCl solutions, more specifically, 50 mM phosphate and 500 mM NaCl. Other fluids, such as buffers, that will not detrimentally alter the matrix material can also be used. Product line 152 can extend down through channel 18 of stand 12 and fluid couple with a container for collecting the product, i.e., the molecule(s) of interest, or with a further processing instrument for processing the product.

Similar to the above, regeneration line 154 fluid couples with chromatography column 30c through first delivery valve assembly 214c and second delivery valve assembly 218c while the fluid exiting chromatography column 30c passes through sensor block 236c, first return valve assembly 240c and second return valve assembly 258c before communicating with regeneration waste line 156. Regeneration line 154 can pass through channel 18 of stand 12 and fluid couple upstream with a source of regeneration fluid. The regeneration fluid can comprise any fluid that will restore the matrix material to its desired properties. One example of the regeneration fluid can comprise a NaOH solution such as 0.1 M NaOH. Regeneration waste line 156 can extend down through channel 18 of stand 12 and fluid couple with a container for collecting the regeneration waste fluid.

As will be discussed below in greater detail, additional fluid channels are formed within panel 20. In part, such fluid channels enable fluid to pass to or between any combination of chromatograph columns 30. Regulation of the flow through the fluid channels is controlled by the valve assemblies. The number of valve assemblies mounted on panel 20 can very based on the number of chromatography columns being used and the desired processing steps. In one embodiment, the number of valve assemblies mounted on panel 20 can comprise at least 8, 10, 12, 16, 20, 24, or 30 or in a range between any two of the foregoing.

The configuration and operation of one embodiment of the valve assembly will now be discussed. Depicted in FIG. 3 is first delivery valve assembly 214a. In general, valve assembly 214a comprises a valve 40a rotatably mounted to panel 20, a support 41a that upstands from top surface 22 of panel 20 adjacent to valve 40a, an actuator 42a disposed on support 41a, and a stem 43a that extends between valve 40a and actuator 42a. Although support 41a is shown as being U-shaped so as to extend over valve 40a, it is appreciated that support 41a can have a variety of different configurations that will support actuator 42a.

For reasons as will be discussed below in greater detail, actuator 42a can function to selectively depress and raise, or at least release, portions of valve 40a and can function to selectively rotate portions of valve 40a in opposite directions. As such, in one embodiment, actuator 42a can comprise a solenoid 270a that selectively depresses and raises/releases stem 43a and a motor 274a, such as a stepper motor, that selectively rotates stem 43a in opposite directions. Other electric or pneumatic mechanism that can achieve the above functions can also be used as actuator 42a. Actuator 42a is in electrical communication with and is controlled by a programmable, central processing unit (CPU) 274. CPU 274 communicates with memory 276, such as non-transitory memory, in which programming and relevant data can be stored. CPU 274 and memory 276 can be positioned remotely and connect with actuator 42*a* either wirelessly through a transmitter and receiver or they can be hardwired together. In other embodiments, CPU 274 and memory 276 can be positioned on panel 20, stand 12, and/or base 26.

Figure 12:
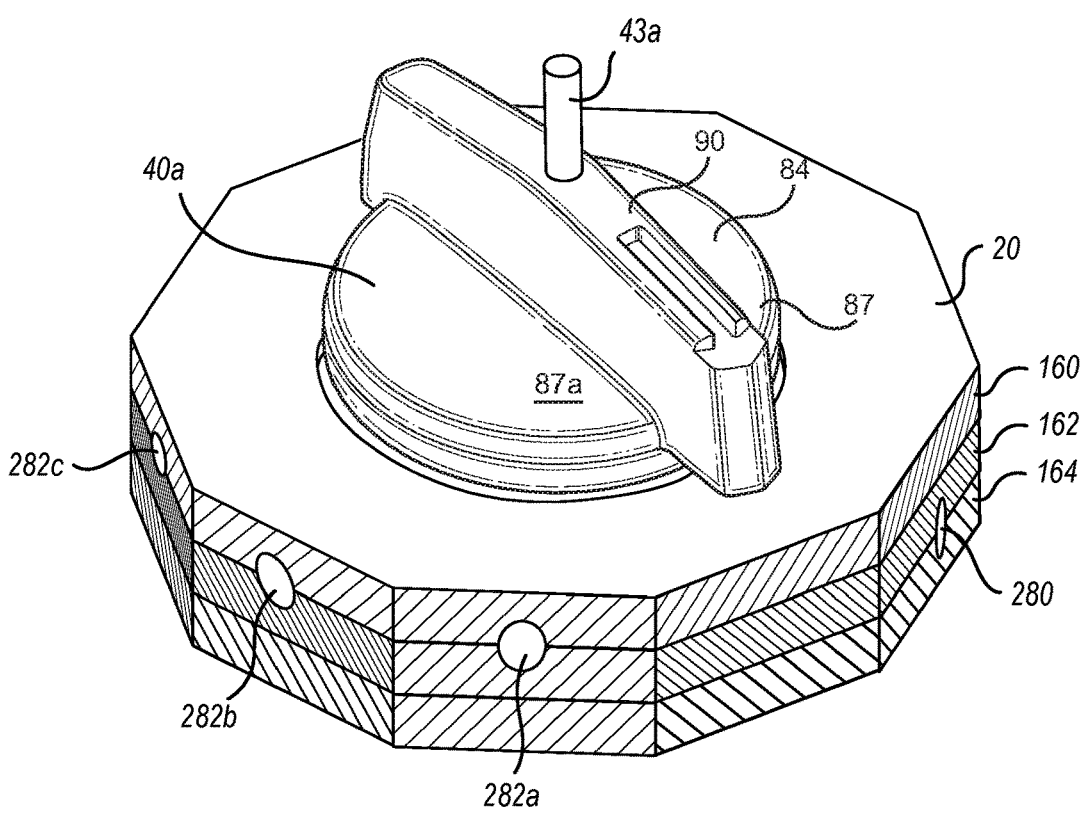
FIG. 12 to a top perspective view of the valve of the valve assembly shown in FIG. 3 disposed within a cutout portion of the panel.

Depicted in FIG. 12 is a perspective view of valve 40*a* encircled by a cutaway portion of panel 20. With reference to the exploded view in FIG. 14, valve 40*a* generally comprises a cover 84, coupler 62, directional component 44, spring 114 and alignment member 100. Panel 20 is specifically configured to receive and engage with valve 40*a* so that no fluid couplings, such as through separate conduits, are required. More specifically, valve 40*a* is configured for selectively changing a flow path of fluid between combinations of an input fluid channel 280 formed in panel 20 and communicating with valve 40*a* and one of a plurality of output fluid channels 282 formed in panel 20 and communicating with valve 40*a*, or alternatively blocking the fluid from flowing to any of output fluid channels 282 from input fluid channel 280. As better depicted in FIGS. 15 and 16, in the illustrated embodiment, the plurality of output fluid channels 282 comprises five output fluid channels 282*a-e*. However, in other embodiments, valve 40*a* can be formed having a variety of different numbers of output fluid channels including at least 2, 3, 4, 5, 6, 7, 8, 9, 10, or 12 or a range between any two of the forgoing numbers. The number of output fluid channels depends, in part, on the number of chromatography columns 30 being used and the desired processing. In the embodiment illustrated in FIG. 3, fluid channel 210*a* corresponds to input fluid channel 280 in FIGS. 15 and 16 while fluid channel 216*a* corresponds to one of output fluid channels 282*a-e*.

Figure 15:
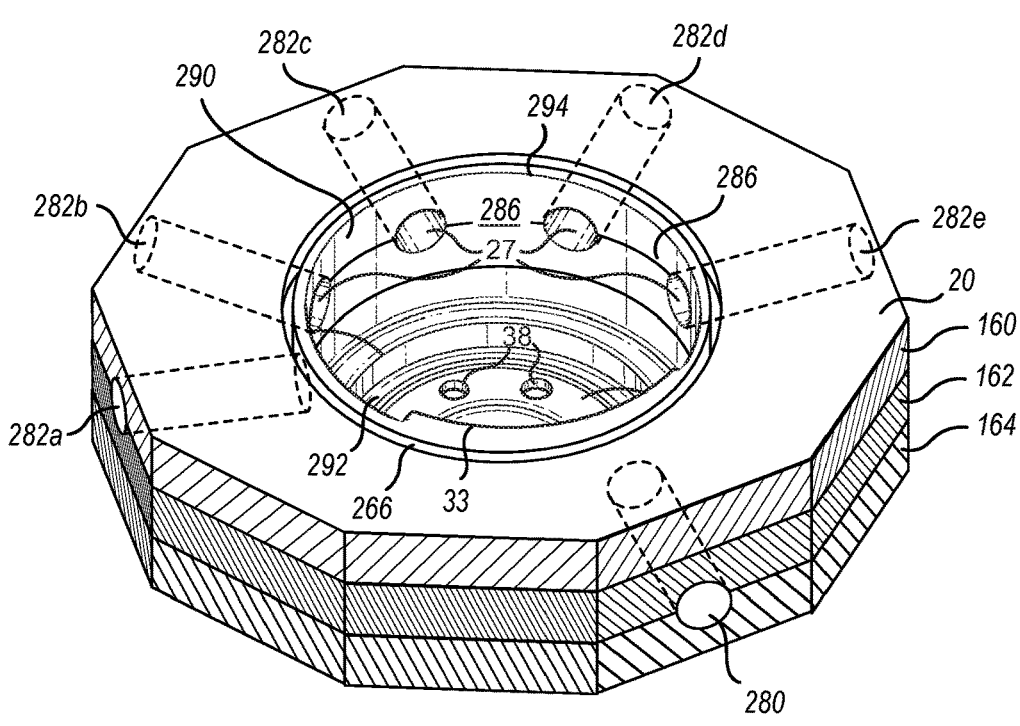
FIG. 15 is a front, top perspective view of the cutout portion of the panel shown in FIG. 12.
Figure 16:
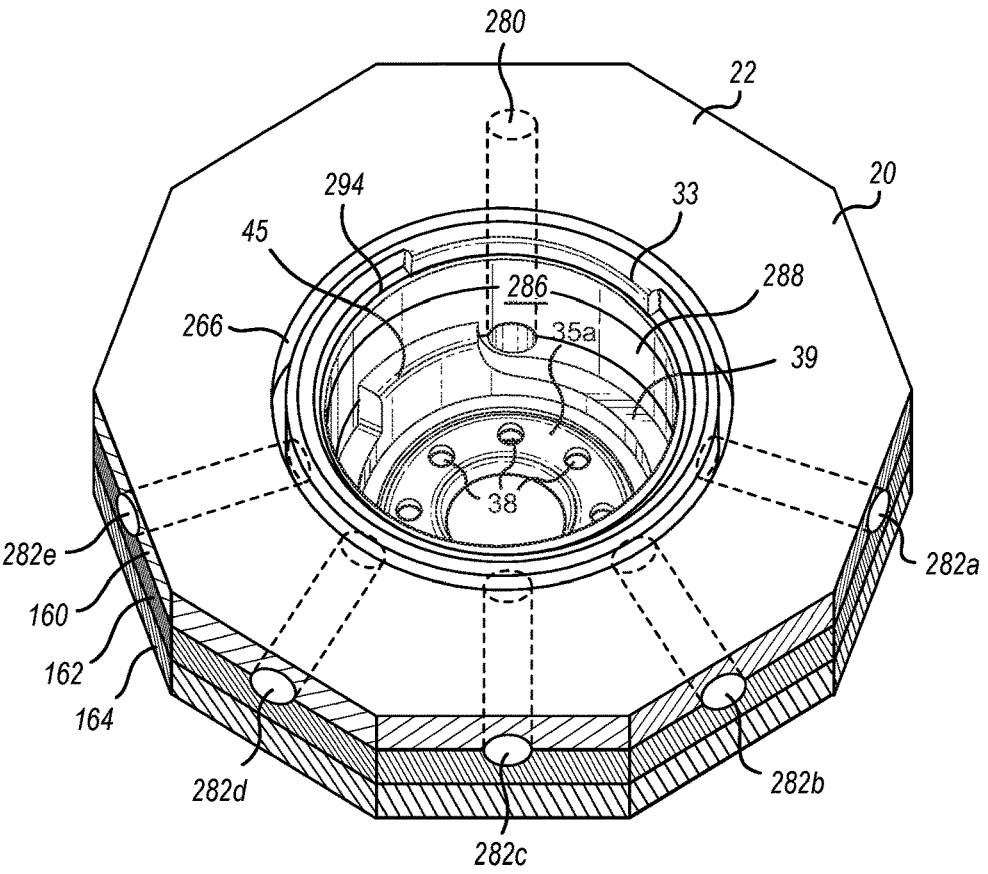
FIG. 16 is a rear, top perspective view of the cutout portion of the panel shown in FIG. 15.

With continued reference to FIGS. 15 and 16, panel 20 has an inner surface 286 that bounds a cavity 288. Cavity 288 extends between an upper end 290 and an opposing lower end 292. Input fluid channel 280 and output fluid channels 282*a-e* are spaced apart and extend radially away from inner surface 286. Although input fluid channel 280 and output fluid channels 282*a-e* are shown as arranged around cavity 288 in a particular arrangement, the relative positions of input fluid channel 280 and output fluid channels 282*a-e* can be rearranged as desired. For convenience in identification hereinafter, output fluid channels 282*a-e* can be referred to as a first output channel 282*a*, a second output channel 282*b*, a third output channel 282*c*, a fourth output channel 282*d*, and a fifth output channel 282*e*. Input fluid channel 280 functions to interface with and receive liquid from an input source, such as from a conduit, valve, or delivery line. Similarly, each of output fluid channels 282*a-e* function to interface with and transmit liquid to an output, such as conduit, valve, or return line.

Figure 26:
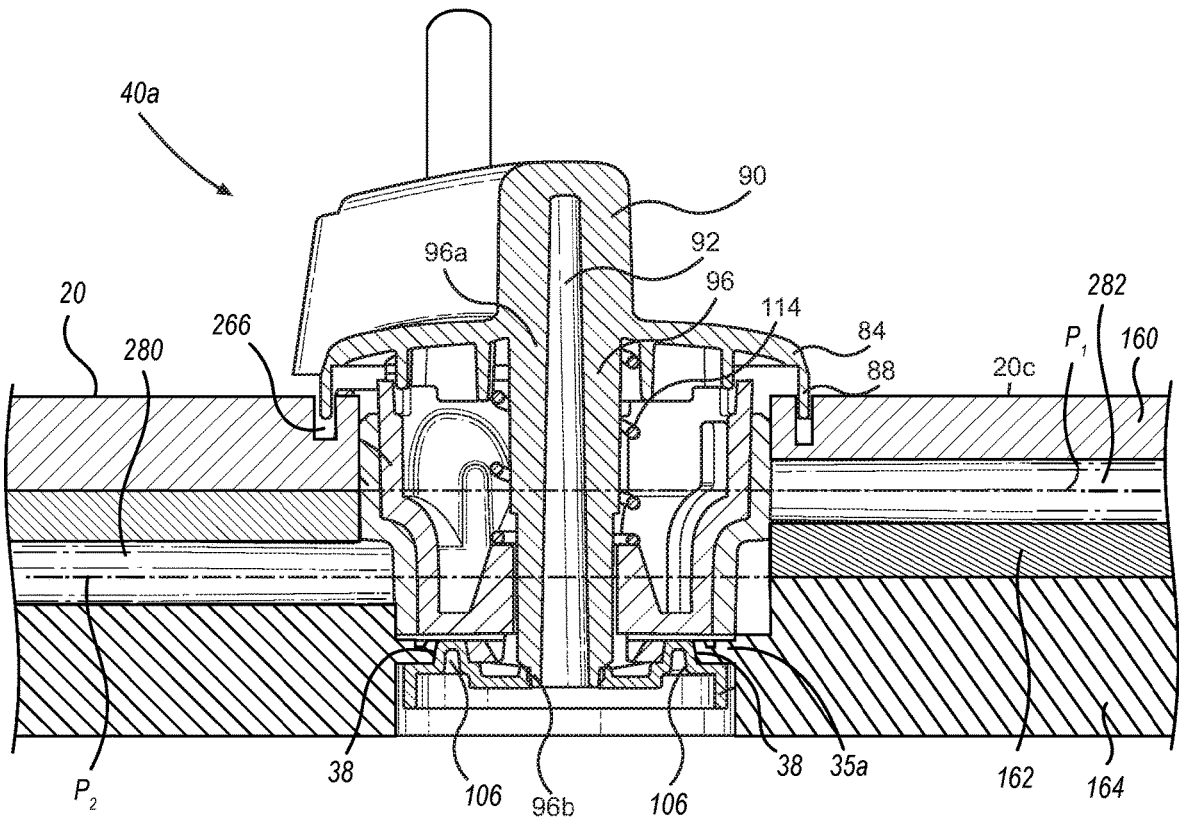
FIG. 26 is a cross sectional side view of the valve shown in FIG. 12.

Input fluid channel 280 and each output fluid channels 282*a-e* has an inner opening 27 on inner surface 286 of panel 20. Inner opening 27 of input fluid channel 280 can herein be referred to as an inlet opening while each opening 27 of output fluid channels 282*a-e* can herein be referred to as an outlet opening. As shown in FIG. 26, a central axis of each of output fluid channels 282*a-e* extends along a first plane $P_1$ and a central axis of input fluid channel 280 extends along a second plane $P_2$. The second plane $P_2$ can be spaced from the first plane $P_1$ and extend substantially parallel to the first plane $P_1$. Though the second plane $P_2$ is depicted as positioned below the first plane $P_1$, the first and second planes $P_1$, and $P_2$, and thus the input fluid channel 280 and output fluid channels 282*a-e*, can be repositioned, e.g. switched, as desired. In the depicted embodiment, first plane $P_1$ is disposed at the intersection between first plate 160 and second plate 162 while second plane $P_2$ is disposed at the intersection between second plate 162 and third plate 164.

Panel 20 is also formed to include a ledge 39 that extends radially inward from inner surface 286 and extends partially around the outer circumference of cavity 288. As shown in FIG. 16, ledge 39 is prevented from extending entirely around the outer circumference of cavity 288 by a flow stop rib 45 that extends upward from ledge 39 and outward from inner surface 286. When valve 40*a* is fully assembled, ledge 39 defines a lower limit of the flow of fluid flowing through valve 40*a* and flow stop rib 45 prevents fluid from flowing in a counter-clockwise direction after it enters input fluid channel 280, as will be discussed further below.

Figure 24:
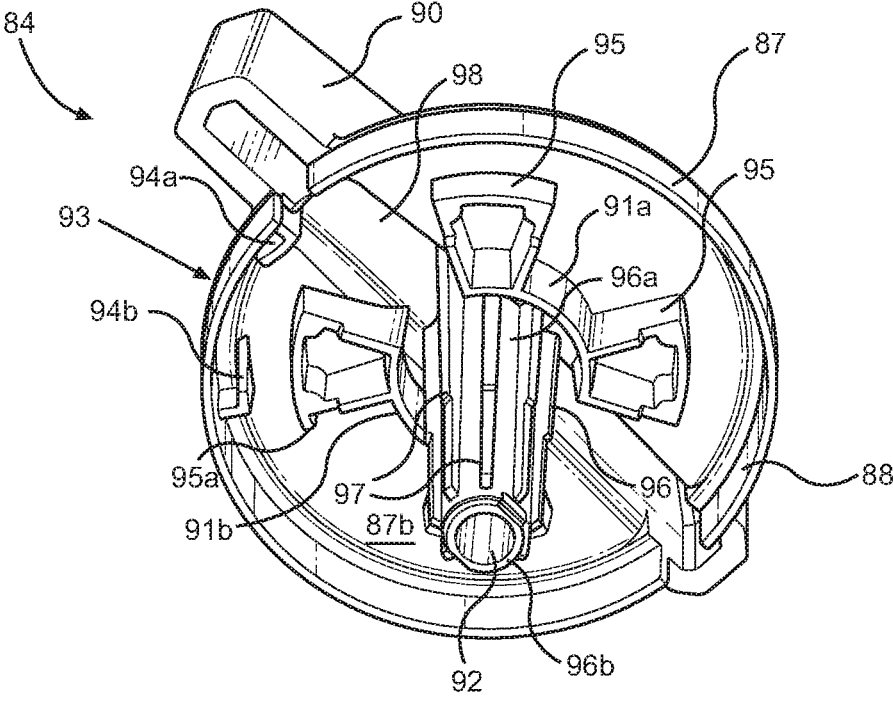
FIG. 24 is a bottom perspective view of the cover shown in FIG. 23.

Inner surface 286 of panel 20 extends upward to an annular shoulder 294 at upper end 290. A stop member 33 upstand from shoulder 294. In one embodiment, the terminal top of stop member 33 is disposed flush with top surface 22 of panel 20. Stop member 33 can be a solid tab that extends vertically upward from shoulder 294, as well as circumferentially around the top of upper end 290 of cavity 288. As shown, stop member 33 can extend about 40 degrees around upper end 290. However, stop member 33 can be alternatively shaped and sized as desired. Stop member 33 is configured to interact with a stop member 93 located on cover 84 (FIG. 24) for limiting the rotational range of directional component 44 relative to panel 20. The interaction between stop member 33 of panel 20 and stop member 93 of the cover 84 will be described further below.

Figure 17:
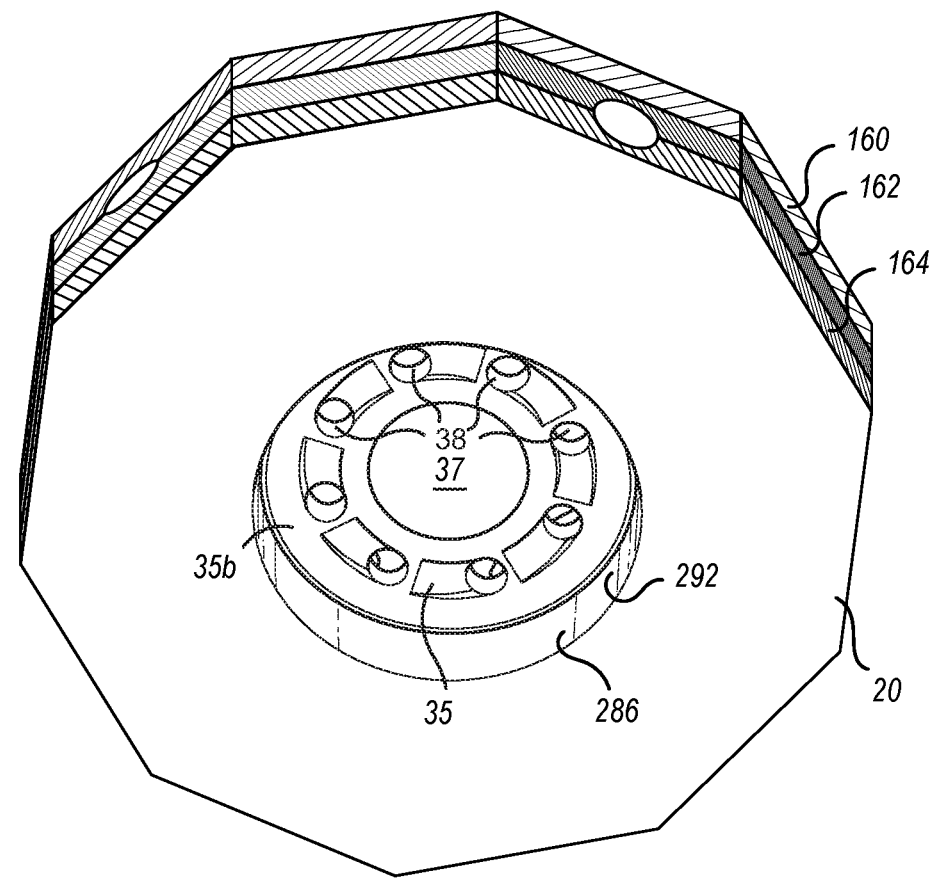
FIG. 17 is a bottom perspective view of the cutout portion of the panel shown in FIG. 15.

Turing to FIG. 17, panel 20 is also formed so as to include a bottom ledge 35 that extends inward from inner surface 286 at the lower end 292. Bottom ledge 35 can be substantially ring-shaped, and can define a top surface 35*a* (FIG. 16), a bottom surface 35*b* opposite top surface 35*a*, and a central bore 37 that extends vertically through bottom ledge 35 from top surface 35*a* to bottom surface 35*b*. Central bore 37 is open to cavity 288, but defines a substantially smaller diameter than cavity 288. Bottom ledge 35 includes at least one alignment bore 38 that extends from top surface 35*a* to bottom surface 35*b*. In the depicted embodiment, bottom ledge 35 includes eight alignment bores 38 equidistantly spaced circumferentially around bottom ledge 35, as well as equidistantly spaced radially from the center of central bore 37. However, it is contemplated that different numbers of alignment bores 38 can be included, and that the relative positions of alignment bores 38 can vary. For example, bottom ledge 35 can include at least 1, 2, 3, 4, 5, 6, 7 alignment bores, or more than eight alignment bores. Bottom ledge 35, and particularly alignment bores 38, function to rotationally lock directional component 44 relative panel 20 in particular positions, as will be described below.

Figure 14:
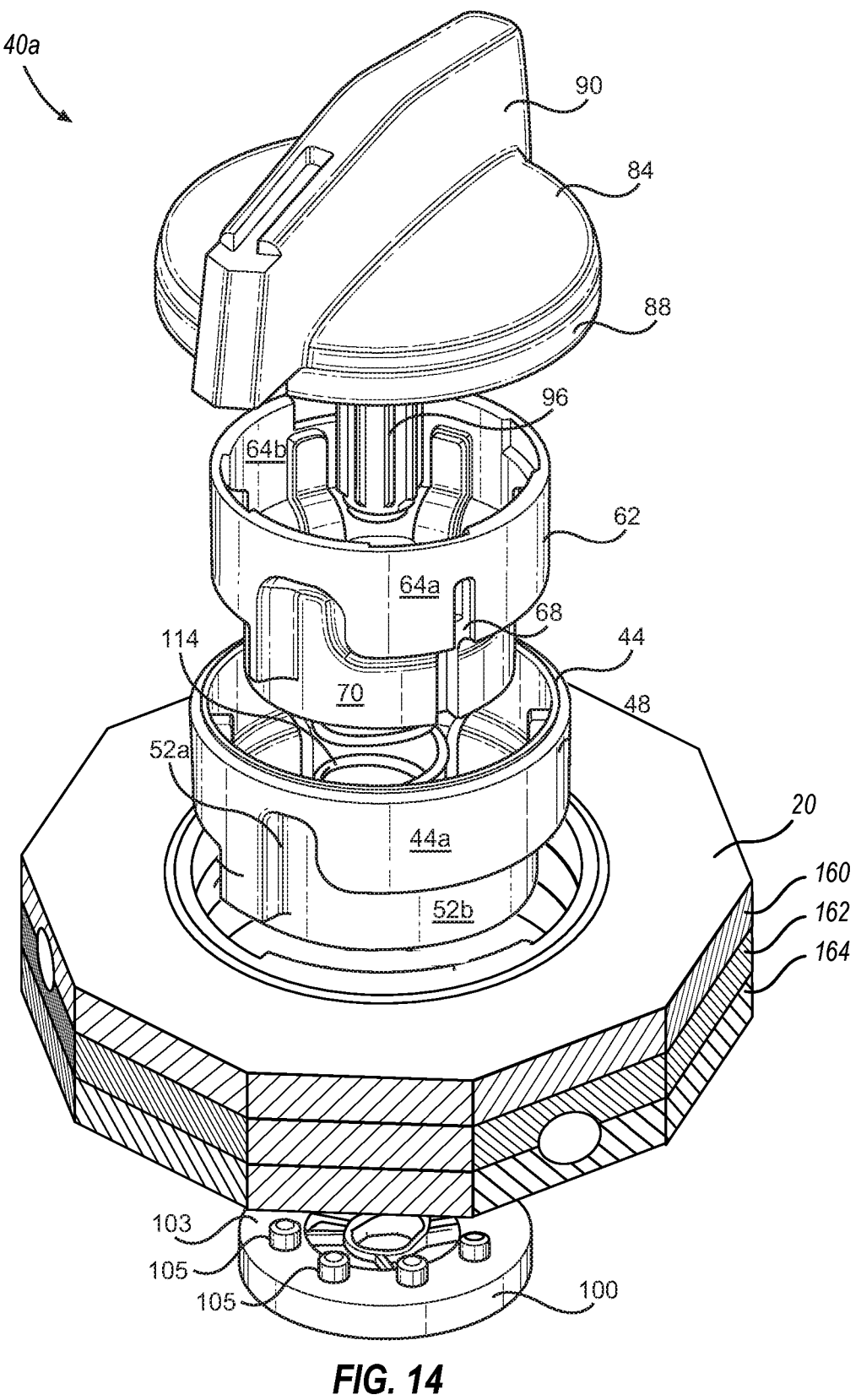
FIG. 14 is exploded view of the valve shown in FIG. 12.
Figure 18:
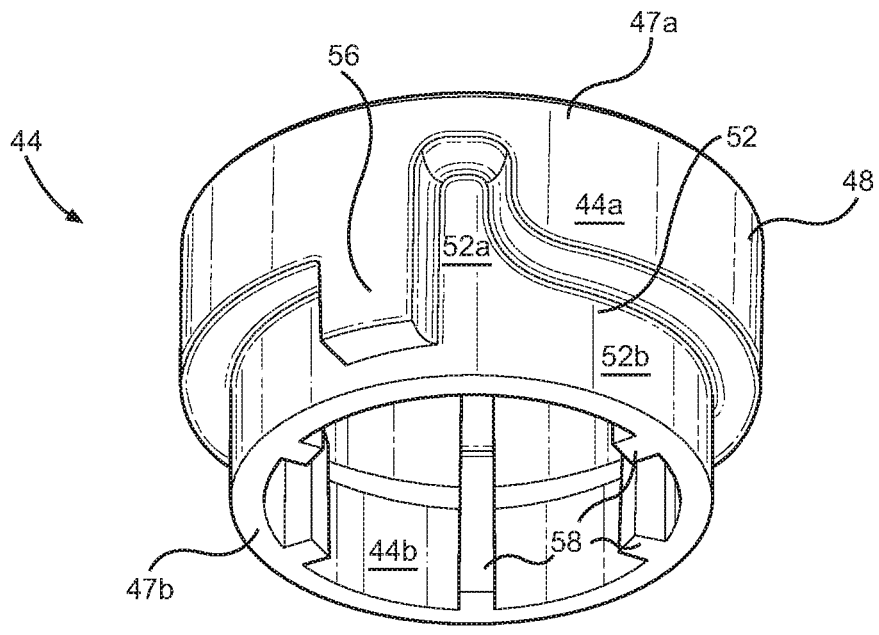
FIG. 18 is a bottom perspective view of the directional component of the valve shown in FIG. 14.
Figure 19:
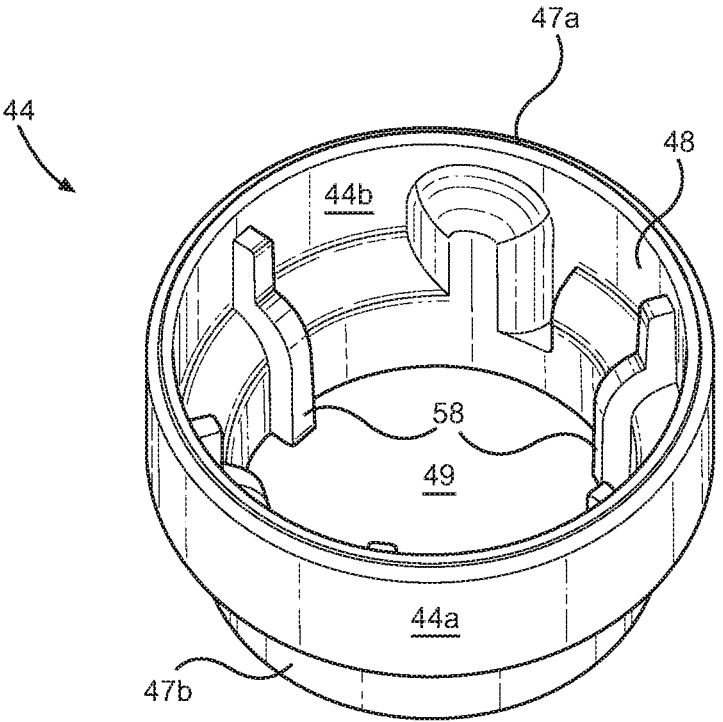
FIG. 19 is a top perspective view of the directional component shown in FIG. 18.
Figures 20, 21, 22:
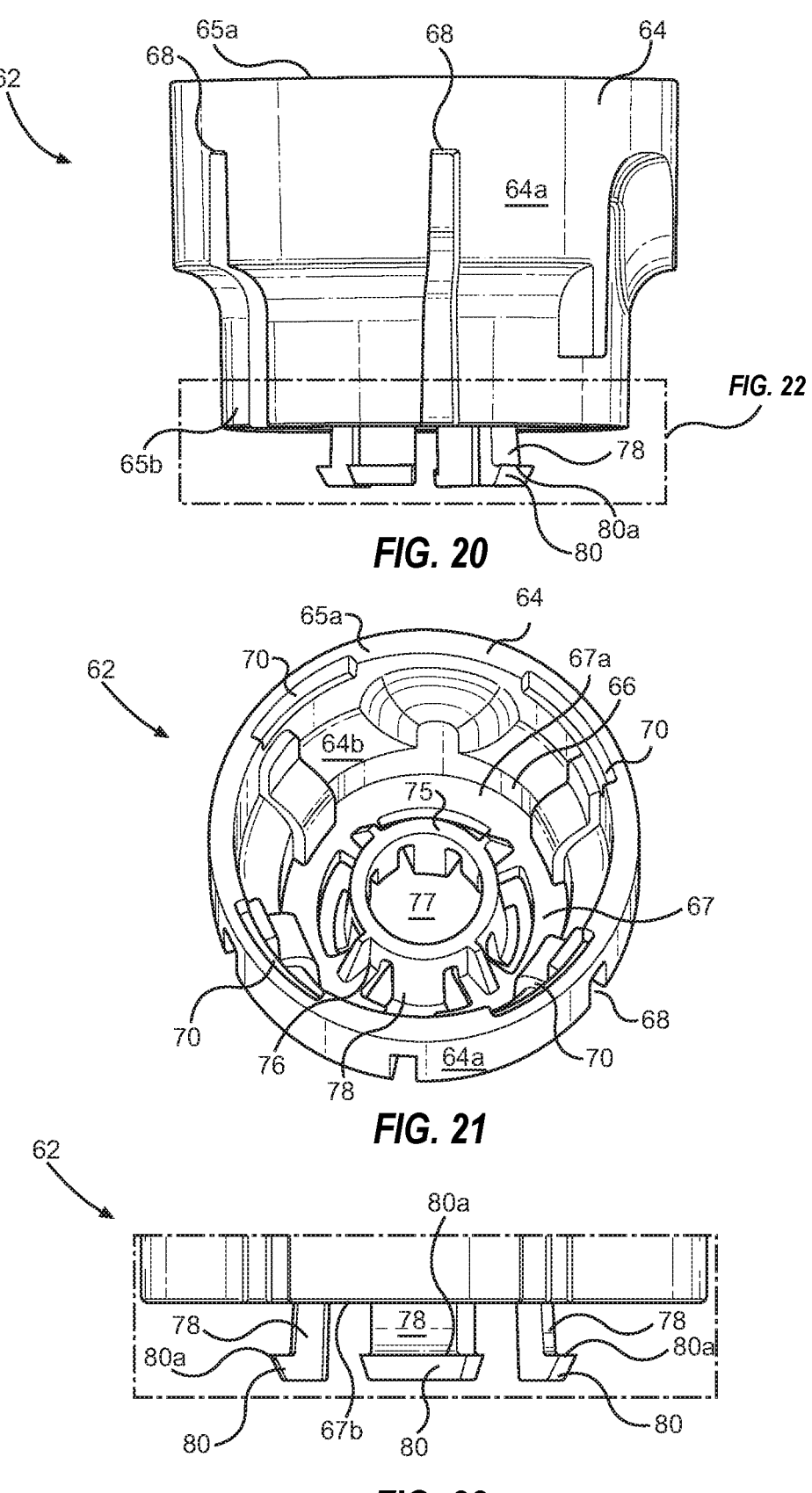
FIG. 20 is an elevated side view of the coupler of the valve shown in FIG. 14.
FIG. 21 is a top perspective view of the coupler shown in FIG. 20.
FIG. 22 is an enlarged elevated side view of a portion of the coupler shown in FIG. 20.
Figure 23:
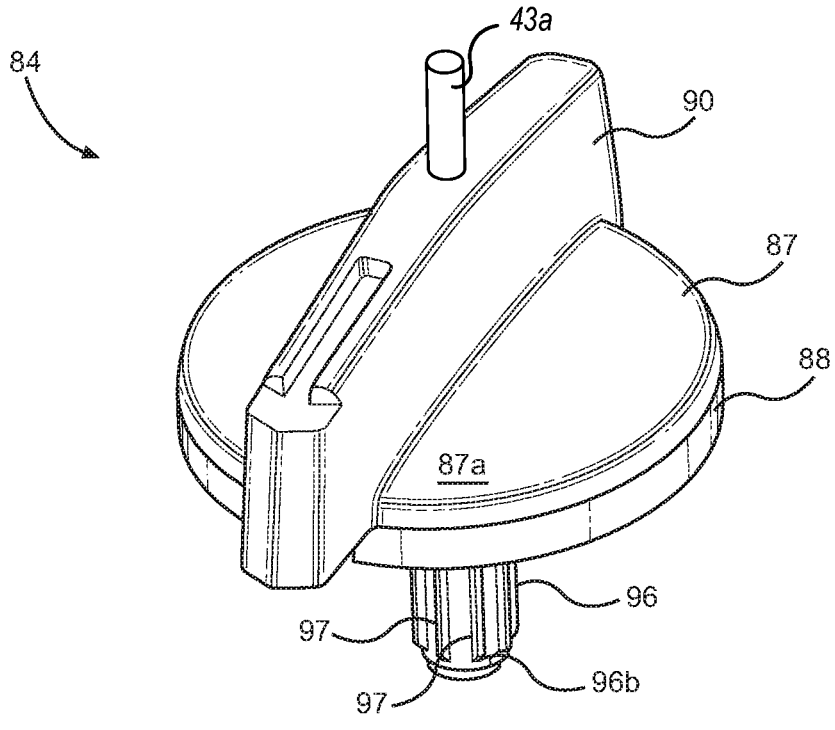
FIG. 23 is a top perspective view of the cover of the valve shown in FIG. 14.

With reference to FIGS. 14, 18, and 19, valve 40*a* includes directional component 44 configured to be received within cavity 288 of panel 20. Directional component 44 includes a sidewall 48 that has an outer surface 44*a*, an inner surface 44*b* opposite outer surface 44*a*, an upper end 47*a*, and a lower end 47*b* opposite the upper end 47*a*. Directional component 44 can be formed of an elastomeric material, such as urethane or silicone. Directional component 44 can also include a central cavity 49 that extends through directional component 44 from upper end 47*a* to lower end 47*b*, central cavity 49 being defined by inner surface 44*b*. As a result, directional component 44 can be substantially shaped as a hollow cylinder, with sidewall 48 having a small thickness relative to the diameter of central cavity 49. Sidewall 48 can have a substantially consistent thickness throughout, such that the shape of inner surface 44b of directional component 44 generally mirrors the shape of outer surface 44a. Outer surface 44a can also be referred to as an engagement sealing surface, as outer surface 44a is configured to contact inner surface 286 of panel 20 (FIG. 16). Directional component 44 can include at least one rib 58 that extends radially inward from inner surface 44b and is configured to engage a corresponding slot 68 defined by coupler 62 (FIG. 20), which will be discussed below. Though five ribs 58 are depicted, directional component 44 can include more or less ribs 58 as desired. For example, directional component 44 can include at least 1, 2, 3, 4, 5, or 6 ribs or a range between any two of the foregoing.

Directional component 44 can include a transfer channel 52 that extends from the outer surface 44a into sidewall 48 and partially around a circumference of directional component 44. When directional component 44 is disposed within cavity 288 of panel 20 and outer surface 44a contacts inner surface 286 of panel 20, the transfer channel 52 can be configured to receive a flow of liquid from input fluid channel 280 and direct the flow of liquid to one of output fluid channels 282a-e. In this embodiment, the transfer channel 52 is a single, continuous channel that is formed across a majority of the circumference of directional component 44, though it is noted that transfer channel 52 is not formed across the entire circumference.

In the depicted embodiment, transfer channel 52 can be understood as comprising two portions—a horizontal portion 52b and a vertical portion 52a that extends from horizontal portion 52b. The width and depth of transfer channel 52 can be selected in order to provide an adequate and constant fluid flow or to satisfy any other functional considerations. Horizontal portion 52b can extend substantially around a majority of the circumference of directional component 44, while vertical portion 52a can extend upward from horizontal portion 52b and terminate at a location below the top of directional component 44. Horizontal portion 52b can define a similar width and depth as vertical portion 52a, though these dimensions may differ as desired. When directional component 44 is disposed within cavity 288 of panel 20 (FIG. 26), the first plane $P_1$ can extend through vertical portion 52a of the transfer channel 52, such that a part of vertical portion 52a is horizontally aligned with output fluid channels 282. Likewise, when directional component 44 is disposed within cavity 288 of panel 20, second plane $P_2$ can extend through horizontal portion 52b of transfer channel 52, such that a part of horizontal portion 52b is horizontally aligned with input fluid channel 280. As a result, in various rotational positions horizontal portion 52b can receive a liquid flow from the input fluid channel 280 and direct the liquid flow to the vertical portion 52a, which then directs the liquid flow to one of output fluid channels 282a-e.

Horizontal portion 52b of transfer channel 52 is prevented from extending completely around the circumference of directional component 44 by a blocking extension 56 (FIG. 18) that extends downwardly from sidewall 48 on the outer surface 44a. Blocking extension 56 divides horizontal portion 52b such that horizontal portion 52b substantially forms a C-shape around the circumference of the directional component 44. Effectively, blocking extension 56 prevents liquid from flowing completely around the entire circumference of directional component 44 when valve 40a is fully assembled. Blocking extension 56 can define a variety of widths, depending on the intended length of horizontal portion 52b of transfer channel 52. Regardless of the width of blocking extension 56, blocking extension 56 can contact the inner surface 286 of panel 20 like the rest of outer surface 44a of directional component 44 that does not define transfer channel 52. In certain rotational positions, blocking extension 56 can align with inner opening 27 (FIG. 15) of input fluid channel 280, such that liquid is prevented from flowing into transfer channel 52 from input fluid channel 280. This rotational position will be discussed further below.

Now referring to FIGS. 14 and 20-22, valve 40a can include coupler 62. Coupler 62 can include a sidewall 64 that defines an outer surface 64a, an inner surface 64b opposite the outer surface 64a, an upper end 65a, and a lower end 65b opposite upper end 65a. Like panel 20 and the directional component 44, coupler 62 can be formed of a substantially rigid polymer, co-polymer, or other plastic. Coupler 62 can also include a central cavity 66 defined by the inner surface 64b that extends through directional component 44 from upper end 65a to lower end 65b. Sidewall 64 can include at least one slot 68 that extends from outer surface 64a of coupler 62 radially into sidewall 64. In the depicted embodiment, coupler 62 is shown as including five slots 68. However, coupler 62 can include more or less slots 68 as desired, though the number of slots 68 will generally correspond to the number of ribs 58 included in directional component 44. This is because when valve 40a is assembled, slots 68 can each receive a corresponding rib 58 of directional component 44 to align and secure directional component 44 and coupler 62 in relation to each other. Likewise, as coupler 62 can be disposed within central cavity 49 of directional component 44, outer surface 64a of coupler 62 can substantially match the shape of inner surface 44b of directional component 44 to ensure a tight fit. Coupler 62 can also include a plurality of recesses 70 that extend from upper end 65a and inner surface 64b into the sidewall 64. Though four recesses 70 are shown, and recesses 70 are shown as being spaced equidistantly around coupler 62, more or less recesses 70 can be included, and recesses 70 can be differently spaced. As will be discussed further, recesses 70 are configured to engage a portion of cover 84 for rotationally fixing cover 84 relative to coupler 62.

The coupler 62 can further include a bottom ledge 67 that extends inward from inner surface 64b at lower end 65b. Bottom ledge 67 can be substantially ring-shaped and can define a top surface 67a and a bottom surface 67b opposite top surface 67a. A plurality of ribs 76 can extend upward from the top surface 67a of bottom ledge 67 to a central support 75 positioned above the bottom ledge 67. Though four ribs 76 are depicted, valve 40a can include more or less than four ribs 76 as desired. The central support 75 can be substantially ring-shaped and can define a bore 77 that extends centrally through. The bore 77 can be open to the central cavity 66 and can define a substantially smaller cross-section than the central cavity 66. When valve 40a is fully assembled, the central support 75 can support the bottom end of a spring 114, (FIG. 26) which will be described further below.

A plurality of extensions 78 can extend downward from the bottom surface 67b of the bottom ledge 67. Each of the extensions 78 can include a lip 80 that extends radially outward from the downward end of the extension 78, where each lip 80 defines a substantially planar upper surface 80a. Though four extensions 78 are shown, the coupler 62 can include more less than four extensions as desired. For example, the coupler 62 can include one extension, two extensions, or more than four extensions. Further, though the extensions 78 are depicted as spaced substantially equidistantly around the bottom ledge 67, it is contemplated that the spacing of the extensions 78 can be altered. In the assembled configuration, when the coupler 62 is disposed within the central cavity 49 of the directional component 44 and the directional component 44 is disposed within cavity 288 of panel 20, extensions 78 can extend through central bore 37 of panel 20 and engage the bottom ledge 35. Specifically, the upper surface 80*a* of each respective lip 80 can engage the bottom surface 35*b* of the bottom ledge 35 of panel 20. This engagement axially secures both coupler 62 and directional component 44 relative to panel 20, while still allowing the coupler 62 and the directional component 44 to rotate relative to panel 20.

Now referring to FIGS. 14, 23, 24 and 26, valve 40*a* further includes cover 84. Cover 84 includes a body 87 that has an upper surface 87*a*, a lower surface 87*b* opposite upper surface 87*a*, and a rim 88 that extends downward from lower surface 87*b*. Cover 84 can be formed of a substantially rigid polymer, co-polymer, or other plastic. A knob 90 can extend upwards from the upper surface 87*a*, where knob 90 is configured to be gripped for manual rotation of cover 84 and rotationally connected components. Knob 90 is depicted as having a greater diameter and height than body 87 for easier manual actuation, though knob 90 can be differently sized or shaped as desired. Stem 43*a* is shown upstanding from knob 90. In an alternative embodiment, knob 90 can be eliminated and stem 43*a* can upstand from body 87.

Cover 84 can also include a shaft 96 that extends downward from an upper end 96*a* attached to lower surface 87*b* of body 87 to a lower end 96*b* axially spaced from body 87. Shaft 96 can define a bore 92 that extends from lower end 96*b* to upper end 96*a* and can include a plurality of fluted ribs 97 that extend radially outward from shaft 96. However, bore 92 can extend to any extent through shaft 96. In addition to shaft 96, knob 90 can also be substantially hollow and define a recess 98 that is in communication with bore 92. When valve 40*a* is fully assembled, shaft 96 can extend through bore 77 defined by central support 75 (FIG. 21) of coupler 62, and lower surface 87*b* of cover 84 can be configured to contact an upper end of spring 114. As a result, spring 114 contacts lower surface 87*b* of cover 84 at its upper end, extends over shaft 96 and fluted ribs 97, and contacts the central support 75 of the coupler 62 at its lower end.

Cover 84 can include a plurality of alignment tabs 95 extending downward from lower surface 87*b* of body 87. Each of alignment tabs 95 can be configured as hollow and substantially trapezoidal and can be received in a corresponding recess 70 of coupler 62 when valve 40*a* is fully assembled. As noted above, interaction between alignment tabs 95 and recesses 70 can serve to rotationally couple coupler 62 to cover 84. As a result, directional component 44 is also rotationally coupled to cover 84. As depicted, cover 84 can include four alignment tabs 95 equidistantly spaced circumferentially around shaft 96. However, the orientation and number of alignment tabs 95 can very as desired. For example, cover 84 can include one, two, or more than four alignment tabs, and alignment tabs 95 can be unequally spaced circumferentially around shaft 96. However, the spacing and number of the alignment tabs 95 will generally correspond to the spacing and number of recesses 70 of coupler 62. In an embodiment, one of alignment tabs 95 can include an extended rib 95*a* that can be received by a respective one of recesses 70. The inclusion of the extended rib 95*a* in one of alignment tabs 95 ensures that cover 84 can be attached to the other components of valve 40*a* in only one orientation. Cover 84 can also include first and second radial ribs 91*a*. 91*b*, where each of the first and second radial ribs 91*a*, 91*b* extends between adjacent ones of alignment tabs

95. The first and second radial ribs 91*a*, 91*b* are configured to engage the outer side of the spring 114 when valve 40*a* fully assembled.

Cover 84 can also include a stop member 93 that extends inward from the inner surface of rim 88. As depicted, stop member 93 includes two circumferentially spaced stops: a first stop 94*a* and a second stop 94*b*. Each of the first and second stops 94*a*, 94*b* can be configured as hooked extensions extending from the inner surface of rim 88, though other configurations are contemplated. Alternatively, stop member 93 can define a single, monolithic stop that extends inward from the inner surface of rim 88. During operation of valve 40*a*, stop member 93 can be utilized to limit rotation of cover 84, and thus coupler 62 and directional component 44, relative to panel 20. This occurs due to the contact between stop member 93 and stop member 33 that projects from upper end 19*a* of panel 20.

Figure 13:
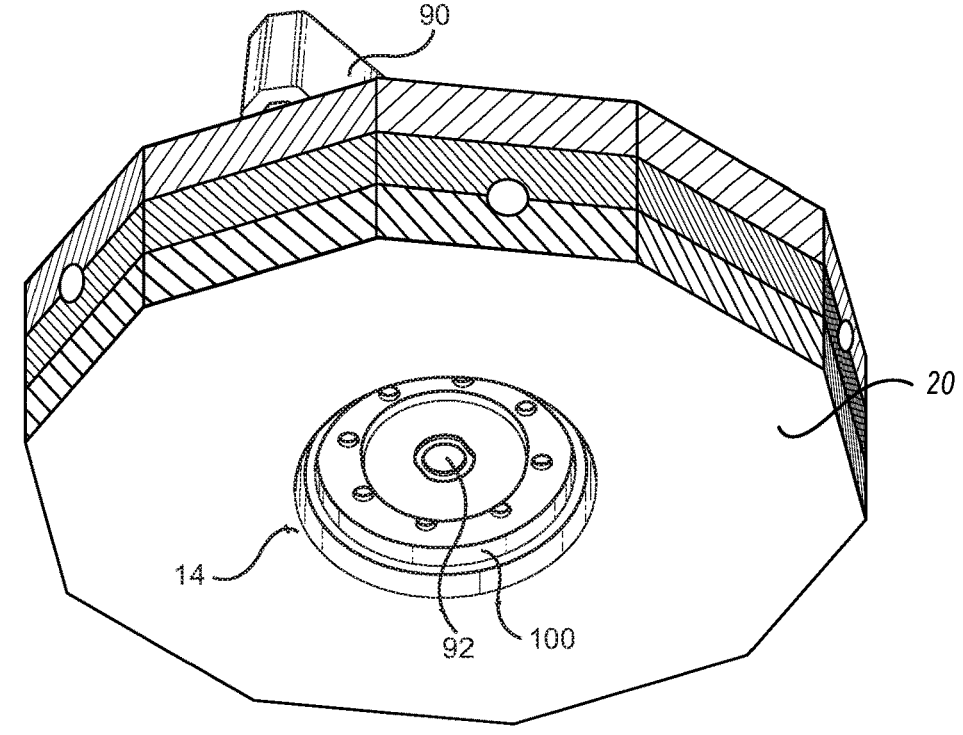
FIG. 13 is bottom perspective view of the valve shown in FIG. 12.
Figure 25:
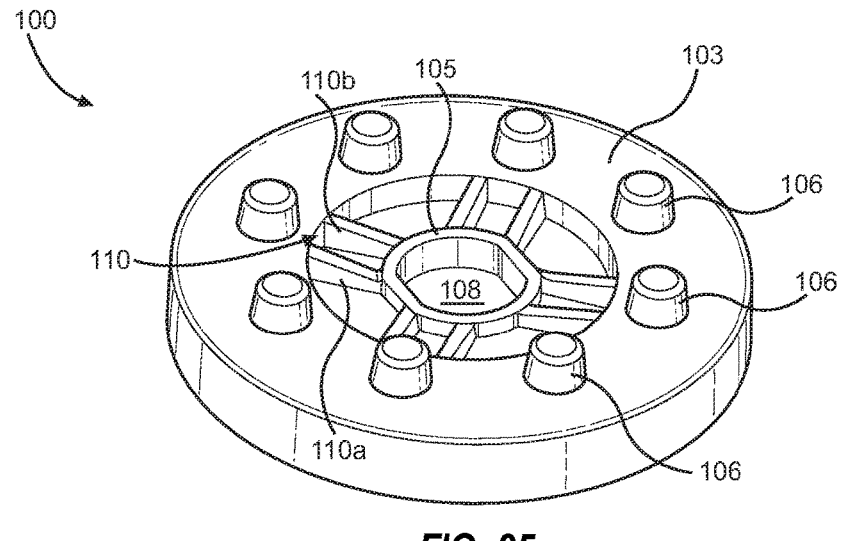
FIG. 25 is a top perspective view of the alignment member of the valve shown in FIG. 14.

Referring to FIGS. 13, 25, and 26, valve 40*a* can further include an alignment member 100 attached to lower end 96*b* of shaft 96 of cover 84. Like the other components of valve 40*a*, alignment member 100 can be formed of a substantially rigid polymer, co-polymer, or other plastic. Alignment member 100 can include a substantially annular body 103 and a plurality of legs 110 extending inward from the inner surface of body 103. Each of legs 110 can include a first leg 110*a* and a second leg 110*b* separate from the first leg 110*a*, and can extend from body 103 to a central ring 105 concentrically positioned with respect to body 103. Though each of legs 110 is shown as including first and second legs 110*a*, 110*b*, each of legs 110 can be alternatively configured. For example, in other embodiments, each of the legs 110 can define a substantially monolithic body. The positioning of body 103, legs 110, and central ring 105 provides alignment member 100 with a substantially wheel and spoke shaped configuration. Central ring 105 defines a bore 108 that extends through central ring 105 and can be centered with respect to body 103 and central ring 105. Central ring 105 can be configured to receive lower end 96*b* of shaft 96 of cover 84 in order to axially and rotationally couple cover 84 to alignment member 100. For example, central ring 105 can be attached to lower end 96*b* of shaft 96 through ultrasonic welding, though other attachment means are contemplated. Alignment member 100 can further include a plurality of protrusions 106 that extend from the upper surface of body 103. Though protrusions 106 are depicted as substantially cylindrical and equidistantly spaced about body 103, protrusions 106 can be alternatively configured as desired. Additionally, though eight protrusions 106 are depicted, alignment member 100 can include different numbers of protrusions 106 in different embodiments. For example, alignment member 100 can include one, two, or more than eight protrusions, where each protrusion is equidistantly spaced or non-equidistantly spaced about body 103. As shown in FIG. 26, each of protrusions 106 is sized and configured to be received in a respective alignment bore 38 of panel 20 for rotationally coupling and decoupling cover 84 relative to panel 20, as will be described below.

Now referring to FIGS. 26-29, the method of rotating components of valve 40*a* and the various flow paths that can be achieved will be described. When valve 40*a* is fully assembled, cover 84 and alignment member 100 are axially movable together relative to panel 20. Without any external forces applied to valve 40*a*, cover 84 is initially in a first vertical position. This position is maintained by spring 114, which applies a biasing force to lower surface 87*b* of cover 84, thus pushing cover 84 upwards. As alignment member 100 is rotationally and axially coupled to cover 84, spring 114 biasing cover 84 upwards also biases alignment member 100 upwards, such that in the first vertical position protrusions 106 of alignment member 100 are disposed within respective alignment bores 38 of panel 20. The interaction between protrusions 106 and panel 20 in the first vertical position causes cover 84, and thus coupler 62 and directional component 44, to be rotationally fixed relative to panel 20. Alignment bores 38 can be designed such that when cover 84 and alignment member 100 are in the first vertical position, directional component 44 is in one of a finite number of predetermined positions, where each predetermined position defines a unique flow path through input fluid channel 280 and output fluid channels 282a-e.

To rotate directional component 44 and alter the flow path through valve 40a, a downward force can be applied to cover 84 to overcome the upward force of the spring 114, thus moving the cover 84 and attached alignment member 100 downward relative to panel 20. With enough force, alignment member 100 can be moved sufficiently downward such that protrusions 106 are spaced downward relative to alignment bores 38. For example, such as a downward force can be produced by actuator 42a (FIG. 3) pushing downward on cover 84 through stem 43a. In one embodiment, an annular groove 266 is recessed on top surface of panel 20 and encircles cavity 288 (FIG. 16). Groove 266 provides room for the perimeter edge of cover 84 to be downwardly depressed. In other embodiment, the perimeter edge of cover 84 can be cut back or cover 266 can be elevated so that groove 266 is not required.

Because protrusions 106 are no longer constrained by the alignment bores 38 when cover 84 and alignment member 100 are in the second vertical position, cover 84 and alignment member 100—along with directional component 44 and coupler 62—can be freely rotated relative to panel 20. For example, such rotation can be produced by actuator 42 rotating cover 84 and alignment member 100 through stem 43a. Cover 84 and alignment member 100 can be rotated in both a first rotational direction $R_1$ and a second rotational direction $R_2$ that is opposite the first rotational direction $R_1$. In the depicted embodiment, the first rotational direction $R_1$ is a counter-clockwise direction, and the second rotational direction $R_2$ is a clockwise direction. Operation of valve 40a can thus rotate cover 84 to obtain the desired fluid flow path when cover 84 and alignment member 100 are in the second vertical position. Once the desired flow path has been achieved, the downward force can be released from cover 84, thus allowing spring 114 to bias cover 84 and alignment member 100 upward again into the first vertical position, and protrusions 106 to again be received in respective ones of alignment bores 38. As noted above, in the first vertical position, cover 84, alignment member 100, directional component 44, and coupler 62 will again be rotationally fixed relative to panel 20. Additionally, the extent to which cover 84 and rotationally coupled components can be rotated in the first rotational direction $R_1$ is limited by the interaction between stop member 93 of cover 84 and stop member 33 of panel 20.

Figures 27, 28:
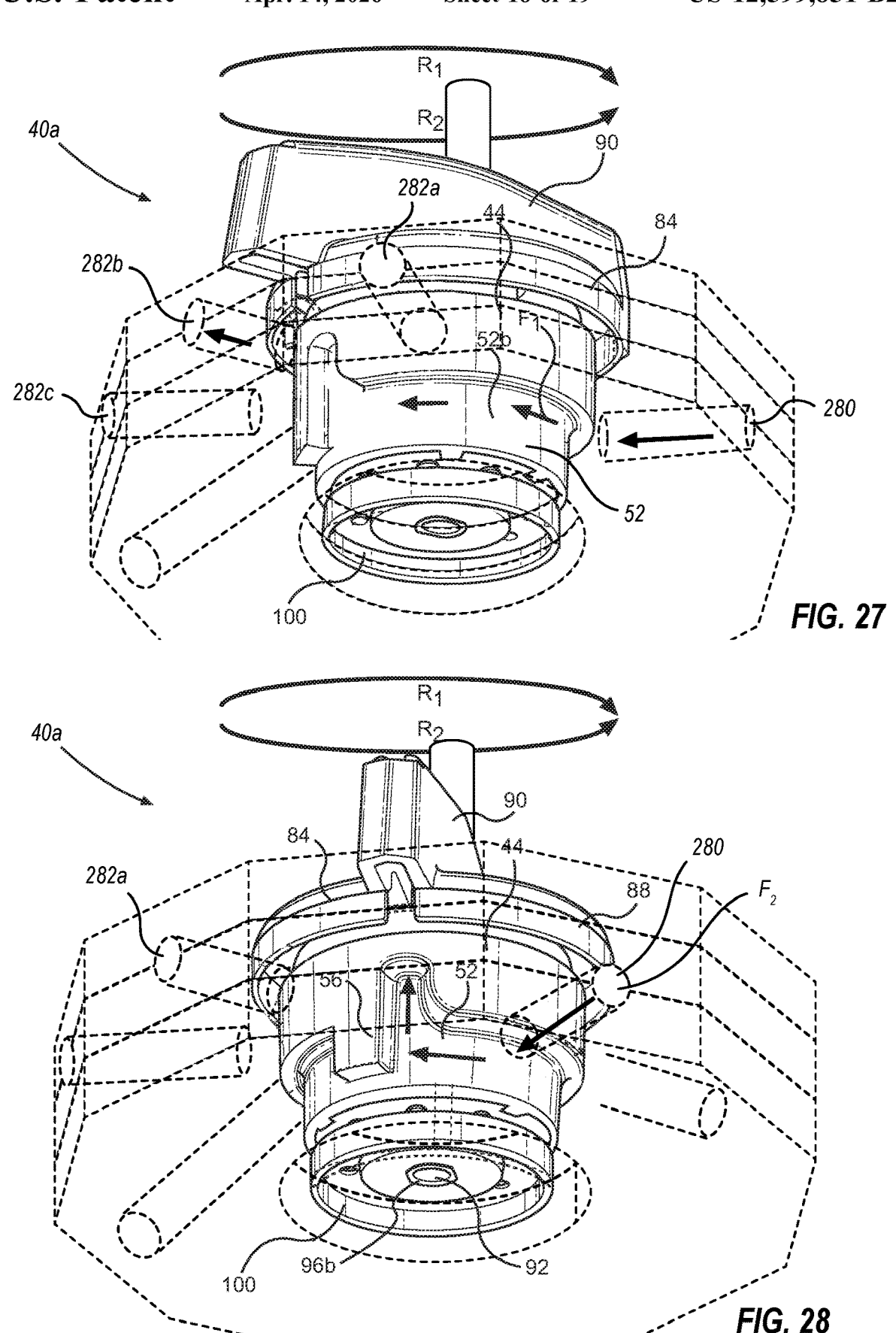
FIG. 27 is a perspective view of the valve shown in FIG. 12 with the valve being rotated to a first position.
FIG. 28 is a perspective view of the valve shown in FIG. 27 with the valve being rotated to a second position.

Continuing with FIGS. 26-29, various rotational positions of valve 40a will be discussed. Referring to FIG. 27, in a first rotational position a first flow path $F_1$ is defined through valve 40a. In the first rotational position, input fluid channel 280 receives a flow of fluid from an input, which then flows through input fluid channel 280, through transfer channel 52, and to second output channel 282b. Between input fluid channel 280 and second output channel 282b, the flow of fluid is contained by transfer channel 52, the inner surface 286 of panel 20, and ledge 39 (FIG. 16), each of which prevents the fluid from escaping transfer channel 52 and migrating to any of the other output fluid channels 282. Due to the presence of blocking extension 56, the fluid is prevented from flowing within transfer channel 52 entirely around the complete circumference of directional component 44 in the second rotational direction $R_2$. Likewise, flow stop rib 45 prevents the fluid from flowing around the circumference of directional component 44 in the first rotational direction $R_1$ after entering the valve 40a through input fluid channel 280.

To alter the fluid flow path, a force is applied to cover 84, as previously described, to move cover 84 and alignment member 100 from the first vertical position to the second vertical position. When the cover 84 and alignment member 100 are in the second vertical position, cover 84 can be rotated in the second rotational $R_2$ to a second rotational position, as shown in FIG. 28. Cover 84 can be prevented from rotating in the second rotational direction $R_2$ from the first rotational position to the second rotational position by the interaction of stop member 93 of cover 84 and the stop member 33 of panel 20. However, in other embodiments the rotational movement of cover 84 from the first rotational position to the second rotational position can be reversed. Stop member 93 of cover 84 and stop member 33 of panel 20 can be configured such that the second rotational position depicted in FIG. 28 is the furthest cover 84 and the rotationally coupled components can be rotated relative to the panel 20 in the first rotational direction $R_1$. In the second rotational position, blocking extension 56 of directional component 44 is positioned circumferentially between input fluid channel 280 of panel 20 and first output channel 282a. As a result, a second flow path $F_2$ is defined in the second rotational position, in which the blocking extension 56 and flow stop rib 45 prevent the flow of fluid from exiting valve 40a through any of output fluid channels 282a-e. The second flow path $F_2$ thus only extends from the input to the end of the vertical portion 52a of transfer channel 52. Because of this, the second rotational position can be referred to as an off position for valve 40a, as no fluid will be transferred through the valve 40a from input fluid channel 280 to any of output fluid channels 282a-e.

Figure 29:
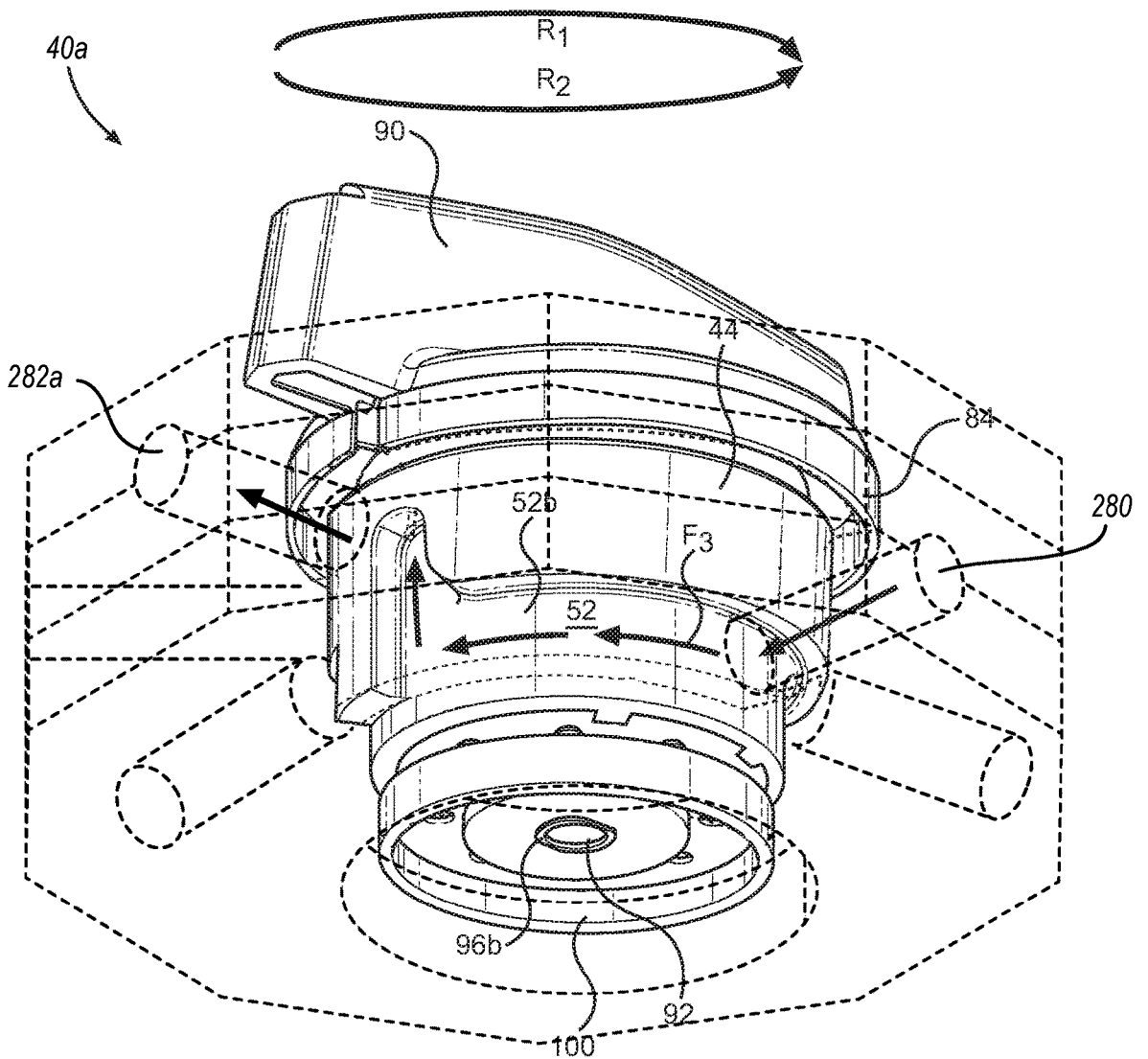
FIG. 29 is a perspective view of the valve shown in FIG. 27 with the valve being rotated to a third position.

After cover 84, and thus directional component 44, is in the second rotational position, cover 84 and alignment member 100 can be axially moved from the first vertical position to the second vertical position to allow cover 84 to be rotated in the second rotational direction $R_2$ to a third rotational position, as shown in FIG. 29. In the third rotational position, a third flow path $F_3$ is defined through valve 40a. In the third rotational position, input flow channel 280 receives a flow of fluid from an input, which then flows through the input flow channel 280, through transfer channel 52, and to first output channel 282a. Between input flow channel 280 and first output channel 282a, the flow of fluid is contained by transfer channel 52, inner surface 286 of panel 20, and ledge 39, each of which prevents the fluid from escaping the transfer channel 52 and migrating to any of the other output fluid channels 282a-e. While rotation of cover 84 and directional component 44 is only described from the first rotational position to the second and third rotational positions, rotation between any combination of these rotational positions, as well as other rotational positions that direct fluid to any of output fluid channels 282a-e, can be performed as desired. Also, while rotation may be described with reference to only certain components, such as cover 84 and directional component 44, rotation of cover 84 also causes rotation of the alignment member 100, coupler 62, and directional component 44 relative to panel 20.

In view of the forgoing, valve assembly 214a, including valve 40a thereof, is able to receive a fluid through input fluid channel 280 and then direct the fluid to any select one of output fluid channels 282a-e. Valve 40a and portions of valve assembly 214a incorporate features of but are modified relative to the multi-port valve disclosed in US Publication No. 2019/0249787, published Aug. 15, 2019. However, the disclosure, operation, and alternatives of the multi-port valve disclosed in US Publication No. 2019/0249787 are also relevant to valve 40a and valve assembly 214a and thus US Publication No. 2019/0249787 is incorporated herein by specific reference. In alternative embodiments, it is appreciated that other types of valve assemblies/valves that perform the same function can also be used as valve 40a and/or at least portions of valve assembly 214a. Examples of such valve assemblies/valves are disclosed in U.S. Pat. No. 9,371,921, issued Jun. 21, 2016 and U.S. Pat. No. 9,481,477, issued Nov. 1, 2016, which are also incorporated herein by specific reference.

Figure 1B:
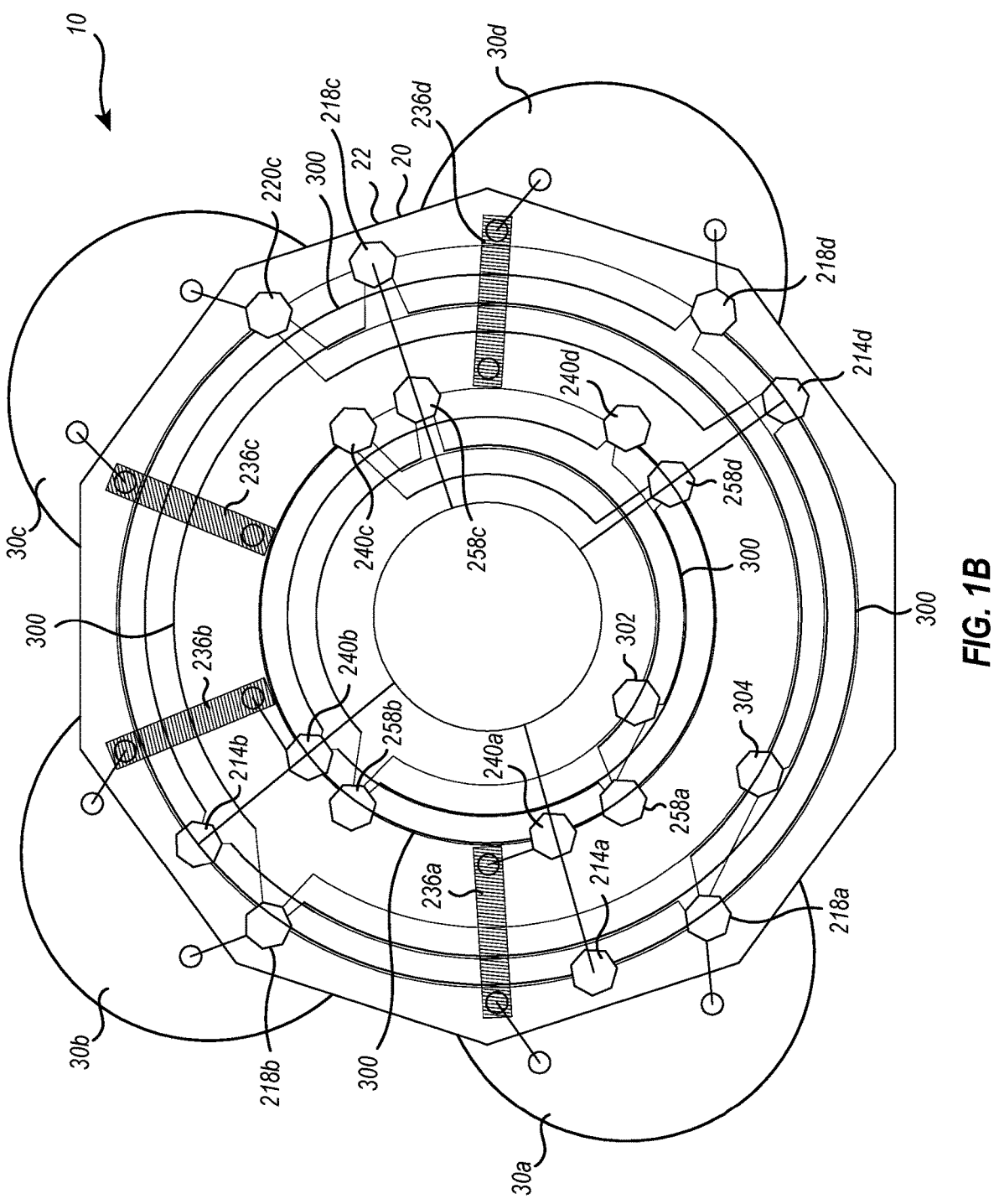
FIG. 1B is a schematic top plan view of the chromatography system shown in FIG. 1A with additional fluid channels being shown within the panel.

Turing to FIG. 1B, a further top plan view of chromatography system 10 is shown. However, in this view a plurality of additional fluid channels are formed within panel 20 that extend between different valve assemblies. These additional fluid channels can be disposed between first plate 160 and second plate 162 and/or between second plate 162 and third plate 164 and/or between any other combinations of plates forming panel 20 as previously discussed and are herein referred to as fluid channels 300. Although fluid channels 300 can connect to each of the different valve assemblies in a variety of different configurations depending on the configuration and desired processing of chromatography system 10, in the depicted embodiment, each of first delivery valve assemblies 214a, 214b, and 214c are fluid coupled to each of second delivery valve assemblies 218a, 218b, and 218c through separately formed fluid channels 300 bound in panel 20. Likewise, each of first return valve assemblies 240a, 240b, and 240c are fluid coupled to each of second return valve assemblies 258a, 258b, and 258c through separately formed fluid channels 300 bound in panel 20.

Furthermore, as depicted in FIG. 1A, chromatography system 10 also comprises a valve assembly 302 and a valve assembly 304 rotatably mounted on panel 20 and having the same configuration and alternatives as valve assembly 214a disclosed herein. Valve assembly 302 is fluid coupled to an inlet of a pump 306 through a fluid channel 308 of panel 20 extending from valve assembly 302 and a conduit 310 disposed outside of panel 20 extending from fluid channel 308 to the inlet of pump 306. In turn, valve assembly 304 is fluid coupled to an outlet of pump 306 through a fluid channel 312 of panel 20 extending from valve assembly 304 and a conduit 314 disposed outside of panel 20 and extending from fluid channel 312 to the outlet of pump 306. Returning to FIG. 1B, each first return valve assembly 240a, 240b, and 240c is also fluid coupled to valve assembly 302 through separately formed fluid channels 300 while each second delivery valve assembly 218a, 218b, and 218c is fluid coupled to valve assembly 304 through separately formed fluid channels 300. As discussed below, pump 306 can be used to assist in transferring the liquid feed between chromatography columns 30.

Finally, FIG. 1A also shows valve assemblies that are operably coupled with chromatography column 30d. Specifically, fluid can flow from a delivery valve assembly 214d to delivery valve assembly 218d an into chromatography column 30d. Fluid can then flow out of chromatography column 30d, through sensor 236d, return valve assembly 240d and return valve assembly 258d. Delivery valve assembly 214d is also fluid coupled with each of delivery valve assemblies 218a, 218b, and 218c through separately formed fluid channels 300 bound in panel 20 (FIG. 1B). Likewise, first return valve assemblies 240d is fluid coupled to each of second return valve assemblies 258a, 258b, and 258c through separately formed fluid channels 300 bound in panel 20. Valve assemblies 258d and 214d are also fluid coupled together through a pump 316.

Give the above configuration of chromatography system 10, one example of a method of use will now be discussed. It is understood that the liquid flowing from, to, or between lines, valve assemblies, chromatography columns, sensor blocks, and pumps, as discussed below, is passing through the related fluid channels within panel 20 and/or through corresponding conduits, as previously discussed herein, and thus for purposes of simplicity the corresponding fluid channels and conduits are not specifically referenced. Initially a stream of the feed liquid containing a molecule(s) of interest is passed from feed line 146, through valve assemblies 214a and 218a into chromatography column 30a. The matrix e.g., resin or filter, within chromatography column 30a is designed to capture or slow the molecule(s) of interest while the remaining feed liquid passes therethrough. The fluid exiting chromatography column 30a passes into sensor block 236a where a sensor therein, such as a UV sensor, detects whether the molecule of interest is present. If not, the fluid flows through valve assemblies 240a and 258a and out through load waste line 148. Once the molecule of interest is detected by sensor block 236, valve assembly 240a is rotated so that the fluid exiting chromatography column 30a now travels through valve assembly 240a, valve assembly 302, pump 306, valve assembly 304, valve assembly 218b and into chromatography column 30b. The fluid exiting chromatography column 30b passes through sensor block 236b. If the molecule of interest is not detected, the fluid passes through valve assembly 240b, valve assembly 258a and again out through load waste line 148.

To optimize the use of the matrix within chromatography column 30a, the feed liquid continues to flow into chromatography column 30a, as discussed above, until sensor block 236a detects that chromatography column 30a is saturated with the molecule(s) of interest. Valve assembly 214a is then rotated so that the feed liquid no passes through valve assembly 214a, valve assembly 218b and into chromatography column 30b.

Concurrent with the rotation of valve assembly 214a, valve assembly 240a is rotated so that the fluid exiting chromatography column 30a will now pass through valve assembly 240a, valve assembly 258b and out through product line 152. An eluting fluid is dispensed through elute/wash line 150 which passes through valve assembly 214b, valve assembly 218a and into chromatography column 30a. The eluting fluid releases the molecule of interest from the matrix within chromatography column 30a which now passes through sensor block 236a, valve assembly 240a, valve assembly 258b and out through product line 152 as noted above. The eluting fluid continues to flow until sensor block 236a no longer detects the molecule of interest. Once sensor block 236a no longer detects the molecule of interest, the flow of the eluting fluid is switched upstream to a washing fluid which now follows the same path from elute/wash line 150 to chromatography column 30a. The washing fluid washes the eluting fluid from chromatography column 30a which exits by passing through sensor block 236a, valve assembly 240b, valve assembly 258a and again out through load waste line 148.

Once chromatography column 30a is washed, the regeneration liquid is then feed into regeneration line 154 where it passes through valve assembly 214c, valve assembly 218a an into chromatography column 30a. When sensor block 236a detects the regeneration liquid leaving chromatography column 30a, the valve assemblies are adjusted so that the exiting fluid flows through valve assembly 240a, valve assembly 258c and exits out through regeneration waste line 156. The regeneration liquid continues to flow until it is determined that the matrix within chromatography column 30a has been fully regenerated to its original state. For example, this can be determined by flowing a specific quantity of regeneration liquid through chromatography column 30a and/or by flowing regeneration liquid for a predefined time. In some embodiments, it can also be determined by sensor block 236a detecting changes in properties of the regeneration liquid. Other methods known in the art can also be used. Flow of the regeneration liquid can then be stopped, and the valve assemblies turned so that feed line 146 can again deliver a new stream of feed liquid containing the molecule of interest into chromatography column 30a through valve assemblies 214a and 218a. The process can then be repeated as discussed above.

It is understood by those skilled in the art that the above processes being performed with regard to chromatography column 30a can also be performed with one or more of the other chromatography columns. For example, when sensor block 236b detects the presence of the molecule of interest, the flow leaving chromatography column 30b can be delivered to chromatography column 30c. Once chromatography column 30b is saturated with the molecule of interest, the eluting fluid and washing fluid from elute/wash line 150 can be passed down through chromatography column 30b. For example, the eluting and washing of chromatography column 30b may occur concurrently with the regeneration of chromatography column 30a. Finally, chromatography column 30b can be regenerated, such as while chromatography column 30a is again receiving the initial feed liquid. In view of the forgoing, it is appreciated that all of chromatography columns 30 or any desired combination thereof can be used for processing the feed liquid in a continuous flow process. That is, by progressively switching the stream of feed liquid to different chromatography column as a prior chromatography column becomes saturated, the feed liquid can continuously flow until processing of the feed liquid is completed. Accordingly, the number and volume of chromatography columns used is dependent upon the processing being performed. Furthermore, one or more of the chromatography columns being used in a single run can be designed to perform a different function, e.g., collect different molecules of interest.

It is appreciated that embodiments of the disclosed chromatography system have a number of advantages. For example, panel 20 bounding the various fluid channels can be easily and inexpensively fabricated. More specifically, panel 20 can be produced quicker and at a lower cost than conventional systems where large numbers of separate tubing sections must be manually fluid connected together. In addition, in contrast to conventional systems that incorporate a separate pinch valve for each tube to control fluid flow, the present design uses a single rotatable valve to control the operation of several fluid channels. As a result, the void volume of the present design is substantially less than for conventional systems of comparable production capacity. As a result, smaller volumes of a feed liquid can be more efficiently processed and there is less fluid waste. Likewise, panel 20 and the conduits used therewith can be economically produced as single-use items that are disposed of and replace after each run, thereby avoiding the need for cleaning or sterilization.

Furthermore, pinch valves typically cannot efficiently operate on small diameter tubes. As a result, tubes are typically used in conventional system that are larger than needed. The use of such tubes increases void volume which results in unnecessary waste. In contrast, because the present design does not incorporate pinch valves, the fluid channels within panel 20 can be produced having a smaller and more efficient diameter or cross-sectional area, thereby again deceasing void volume and unnecessary waste. Another problem with pinch valves and associated tubing is that when small diameter tubing is used with caustic solutions, the pinch valves can fuse the tubing closed. Embodiments of inventive design eliminate the risk of tubing being fused closed. In addition, because of the easy design and fabrication of panel 20 with the valve assemblies, chromatography systems can be easily and inexpensively custom designed for specific processing needs. In addition, embodiments of the inventive system enable easy replacement of the sensor blocks, either between different runs or while other circuits are being operated. Having the sensor blocks close to the output of the columns enables efficient control of fluid flow and switching between different chromatography columns. In addition to the above, further benefits are also derived from the modular and easily replaceable sensor blocks, as previously discussed herein. In general, the system as a whole reduces setup time for a chromatography system, limits risk of operator error, and simplifies the complexity of operating such a system. Other benefits and advantages also exist.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, processes, and/or products according to certain embodiments of the present disclosure may include, incorporate, or otherwise comprise properties features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features without necessarily departing from the scope of the present disclosure.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. A chromatography system comprising:
a plurality of chromatography columns;
a panel comprising a first plate overlying and being secured to a second plate, the panel having a top face and an opposing bottom face, a first cavity being formed on the panel so as to pass through the top face, the first cavity being encircled by an inner surface, the panel bounding:
an inlet fluid channel at least partially bounded between the first plate and the second plate and having a first end and an opposing second end, the second end of the inlet fluid channel terminating at an inlet opening formed on the inner surface encircling the first cavity so that the inlet fluid channel communicates with the first cavity; and
a plurality of first outlet fluid channels, each of the plurality of first outlet fluid channels having a first end and an opposing second end, the first end of each of the plurality of first outlet fluid channels terminating at an outlet opening formed on the inner surface encircling the first cavity so that each of the plurality of first outlet fluid channels communicate with the first cavity, a first one of the plurality of first outlet fluid channels being in fluid communication with a first one of the plurality of chromatography columns; and
a first valve movably disposed within the first cavity, wherein moving the first valve to different positions produces isolated fluid communication between the inlet fluid channel and each of the plurality of first outlet fluid channels.

2. The chromatography system as recited in claim 1, wherein the first valve is rotatably disposed within the first cavity, and wherein rotating the first valve to different positions produces isolated fluid communication between the inlet fluid channel and each of the plurality of first outlet fluid channels.

3. The chromatography system as recited in claim 1, wherein the inlet fluid channel is disposed in a different plane of the panel than the plurality of first outlet fluid channels.

4. The chromatography system as recited in claim 1, wherein the first plate has a bottom surface and the second plate has a top surface, an elongated channel groove being recessed into the bottom surface of the first plate or the top surface of the second plate, the channel groove comprising at least a portion of the inlet fluid channel.

5. The chromatography system as recited in claim 1, wherein the first plate and the second plate are secured together by an adhesive or welding.

6. The chromatography system as recited in claim 1, further comprising a gasket disposed between the first plate and the second plate, the gasket at least partially bounding the inlet fluid channel.

7. The chromatography system as recited in claim 1, wherein the panel is comprised of a polymer and has a thickness of at least 0.4 cm.

8. The chromatography system as recited in claim 1, wherein the panel is sufficiently rigid that it cannot bend over an angle of at least 40° without plastic deformation.

9. The chromatography system as recited in claim 1, wherein the panel comprises a first plate overlying and being secured to a second plate, each of the plurality of first outlet fluid channels being at least partially bounded between the first plate and the second plate.

10. The chromatography system as recited in claim 1, wherein the panel comprises a first plate, a second plate, and a third plate secured together, the second plate being sandwiched between the first plate and the third plate.

11. The chromatography system as recited in claim 10, wherein at least one of the plurality of first outlet fluid channels is at least partially bound between the first plate and the second plate and wherein the inlet fluid channel is at least partially bounded between the second plate and the third plate.

12. The chromatography system as recited in claim 10, wherein the inlet fluid channel passes through the second plate so as to communicate with the first plate and the second plate.

13. The chromatography system as recited in claim 1, further comprising:
a second cavity being formed on and passing through the top face of the panel and encircled by an inner surface;
the second end of the first one of the plurality of first outlet fluid channels terminating at an inlet opening formed on the inner surface encircling the second cavity so that the first one of the plurality of first outlet fluid channels communicate with the second cavity;
a second valve rotatably disposed within the second cavity; and
a plurality of second outlet fluid channels being bounded within the panel and each having a first end and an opposing second end, the first end of each of the plurality of second outlet fluid channels terminating at an outlet opening formed on the inner surface encircling the second cavity so that each of the plurality of second outlet fluid channels communicate with the second cavity.

14. The chromatography system as recited in claim 1, wherein the first one of the plurality of chromatography columns houses a matrix that is designed for capturing a molecule of interest, the inlet fluid channel being in communication with:
a feed liquid comprising the molecule of interest;
an eluting liquid designed for separating the molecule of interest from the matrix of the first one of the plurality of chromatography columns; or
a regeneration liquid for the matrix of the first one of the plurality of chromatography columns.

15. The chromatography system as recited in claim 1, further comprising an actuator coupled with the first valve, the actuator being configured to selectively rotate the first valve.

16. The chromatography system as recited in claim 15, wherein the actuator is further configured to selectively depress and release the first valve.

17. The chromatography system as recited in claim 15, further comprising a central processing unit (CPU) in electrical communication with the actuator and being programmed to automatically control operation of the actuator.

18. The chromatography system as recited in claim 1, further comprising a sensor block removably mounted on the panel and being in fluid communication with an outlet of the first one of the plurality of chromatography columns, the sensor block comprising one or more sensors configured to detect properties of a fluid.

19. The chromatography system as recited in claim 18, wherein the sensor block comprises at least one of a conductivity sensor, ultraviolet light (UV) sensor, pressure sensor or temperature sensor.

20. The chromatography system as recited in claim 1, wherein at least a portion of the first cavity extends entirely through the panel between the top face and the opposing bottom face.

* * * * *